(12) United States Patent
Terashima

(10) Patent No.: US 9,776,633 B2
(45) Date of Patent: Oct. 3, 2017

(54) SEMICONDUCTOR DEVICE AND CONTROL METHOD

(71) Applicant: Renesas Electronics Corporation, Kawasaki-shi (JP)

(72) Inventor: Kazuaki Terashima, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/711,509

(22) Filed: May 13, 2015

(65) Prior Publication Data

US 2015/0367848 A1     Dec. 24, 2015

(30) Foreign Application Priority Data

Jun. 20, 2014    (JP) ................................. 2014-126975

(51) Int. Cl.
     *B60W 30/095*      (2012.01)
     *B60W 30/182*      (2012.01)
     *B60W 50/00*      (2006.01)

(52) U.S. Cl.
     CPC ...... *B60W 30/0956* (2013.01); *B60W 30/182* (2013.01); *B60T 2201/022* (2013.01); *B60W 2050/0095* (2013.01); *B60W 2540/22* (2013.01)

(58) Field of Classification Search
     USPC ........................................................ 701/25
     See application file for complete search history.

(56) References Cited

U.S. PATENT DOCUMENTS

| 4,582,159 | A | * | 4/1986 | Suzuki | ................. | B60K 17/346 |
| | | | | | | 180/247 |
| 7,966,127 | B2 | | 6/2011 | Ono et al. | | |
| 8,565,997 | B2 | | 10/2013 | Kindo et al. | | |
| 8,700,251 | B1 | | 4/2014 | Zhu et al. | | |
| 9,081,385 | B1 | * | 7/2015 | Ferguson | ............. | G05D 1/0246 |

(Continued)

FOREIGN PATENT DOCUMENTS

| JP | 2000-306194 A | 11/2000 |
| JP | 2005-080970 A | 3/2005 |

(Continued)

OTHER PUBLICATIONS

European Search Report dated Oct. 26, 2016.
Japanese Office Action dated Jul. 18, 2017 with an English translation.

*Primary Examiner* — Jean-Paul Cass
(74) *Attorney, Agent, or Firm* — McGinn IP Law Group, PLLC.

(57) ABSTRACT

To achieve an accurate transfer of control from a system to a driver, a semiconductor device includes: a recognition unit that recognizes an object present in the periphery of a vehicle based on a result of observation of the periphery of the vehicle; a route calculation unit that calculates, based on the recognized object, a travel route for the vehicle in an automatic control mode for automatically controlling the vehicle; and a mode control unit that transfers the vehicle from the automatic control mode to a manual control mode for controlling the vehicle according to an operation by a driver, when a travel route to avoid the recognized object cannot be calculated.

17 Claims, 26 Drawing Sheets

(56) References Cited

U.S. PATENT DOCUMENTS

| | | | | |
|---|---|---|---|---|
| 2002/0022927 A1* | 2/2002 | Lemelson | ............... | G01S 19/11 |
| | | | | 701/301 |
| 2009/0174540 A1* | 7/2009 | Smith | ...................... | B60Q 1/34 |
| | | | | 340/465 |
| 2012/0296567 A1* | 11/2012 | Breed | .................... | G01C 21/26 |
| | | | | 701/468 |
| 2014/0180914 A1* | 6/2014 | Abhyanker | .............. | G01C 1/00 |
| | | | | 705/39 |
| 2015/0202770 A1* | 7/2015 | Patron | .................... | G05D 1/024 |
| | | | | 700/245 |
| 2015/0266488 A1* | 9/2015 | Solyom | ............ | B60W 50/0205 |
| | | | | 701/28 |
| 2015/0266489 A1* | 9/2015 | Solyom | ............... | B60W 50/029 |
| | | | | 701/23 |
| 2015/0266490 A1* | 9/2015 | Coelingh | ............ | B60W 50/082 |
| | | | | 701/30.5 |
| 2015/0314780 A1* | 11/2015 | Stenneth | ............... | B60W 30/00 |
| | | | | 701/23 |

FOREIGN PATENT DOCUMENTS

| | | |
|---|---|---|
| JP | 2007-099237 A | 4/2007 |
| JP | 2010-026556 A | 2/2010 |
| JP | 2010-264829 A | 11/2010 |
| WO | WO 2006/070865 A1 | 7/2006 |
| WO | WO 2010/131102 A2 | 11/2010 |

* cited by examiner

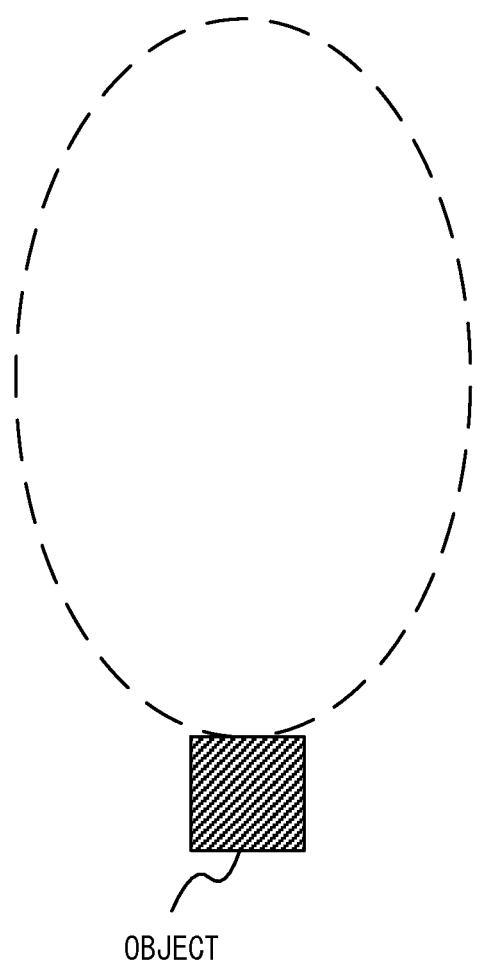
OBJECT
 MOVEMENT DIRECTION
Fig. 4C

OBJECT

↑ MOVEMENT DIRECTION

OBJECT

↑ MOVEMENT DIRECTION

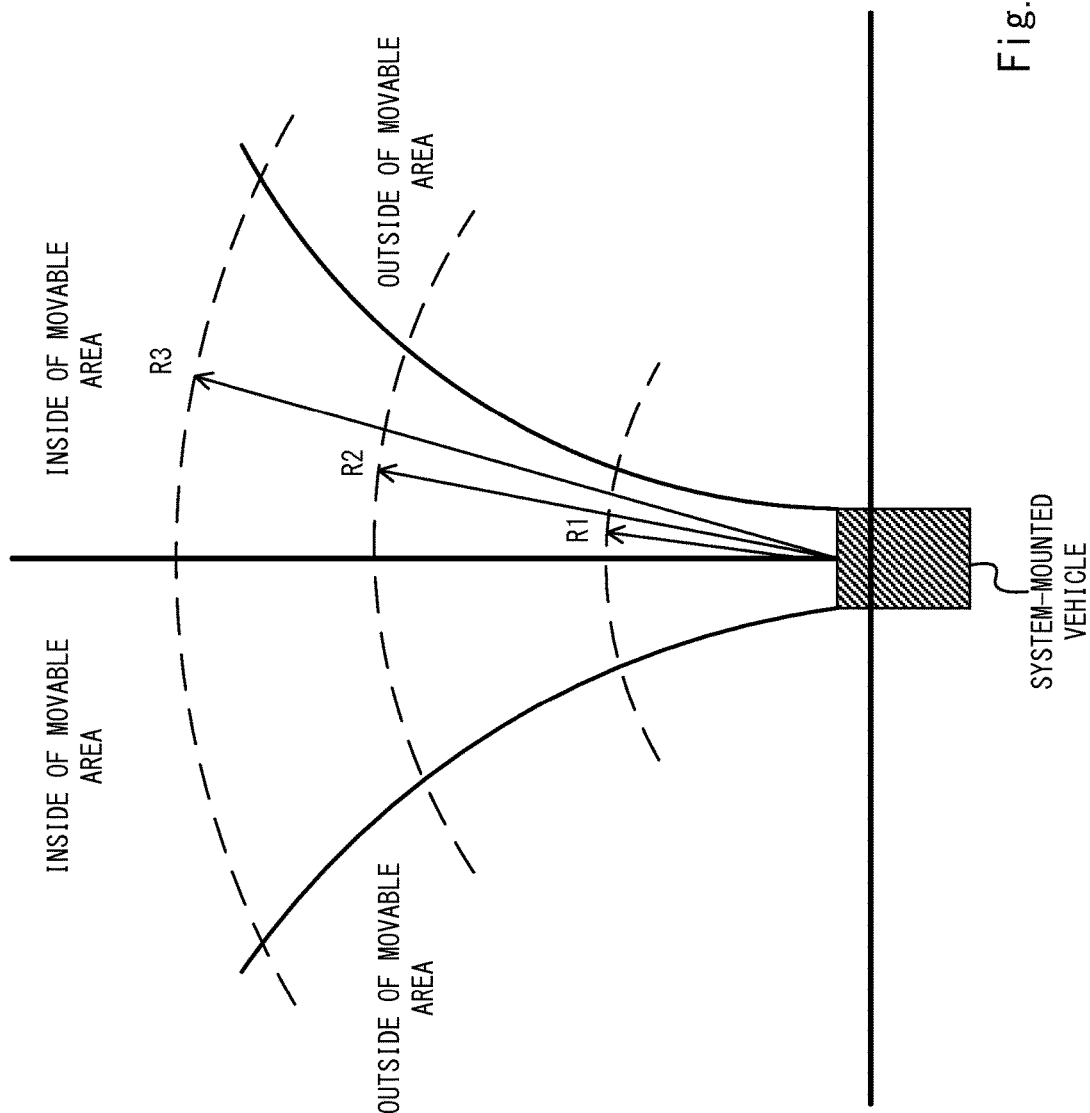

SEMICONDUCTOR DEVICE AND CONTROL METHOD

CROSS-REFERENCE TO RELATED APPLICATIONS

This application is based upon and claims the benefit of priority from Japanese patent application No. 2014-126975, filed on Jun. 20, 2014, the disclosure of which is incorporated herein in its entirety by reference.

BACKGROUND

The present invention relates to a semiconductor device and a control method. For example, the present invention relates to a technique for automatically controlling a vehicle.

Modern vehicles are controlled by a driver. In recent years, systems for assisting a driver or controlling a vehicle, such as ADAS (Advanced Driver Assistance Systems), have been developed, and some of the systems have been put on the market.

In an automated driving (autonomous driving) system, it is important how control between the system and a driver is transferred. The procedure for control transfer is generally referred to as an override (overwrite of operation) request.

Japanese Unexamined Patent Application Publication No. 2010-264829 discloses a driving assist device that properly makes a changeover between automated driving and manual driving for traveling on the basis of a driving operation by a driver. The driving assist device cancels the automated driving when the driving assist device detects an override request from the driver, such as a steering wheel operation, an accelerator operation, a brake operation, or the like by the driver.

In this manner, an override request is issued when the driver tries to actively gain control of a vehicle during control of the vehicle by the system.

SUMMARY

As described above, in the related art, the control transfer is performed in such a manner that the driver or the system tries to actively gain control of the vehicle. Accordingly, there is no flow for the system to play a leading role in transferring control to the driver. In other words, a technique that enables the system to make a judgment and transfer control to the driver has not been achieved.

Other problems to be solved and novel features of the invention will become apparent from the following description and the accompanying drawings.

An exemplary aspect of the present invention is a semiconductor device that enables transfer from an automatic control mode to a manual control mode when a travel route to avoid an object cannot be calculated.

According to the exemplary aspect of the present invention, a technique that enables a system to make a judgment and transfer control to a driver can be achieved.

BRIEF DESCRIPTION OF THE DRAWINGS

The above and other aspects, advantages and features will be more apparent from the following description of certain embodiments taken in conjunction with the accompanying drawings, in which:

FIG. 4C is a diagram showing an example of an area in which a moving object (linearly moving object) is likely to move;

FIG. 6 is a diagram showing an example of calculation of a probability of existence of an object according to a distance;

DETAILED DESCRIPTION

Preferred embodiments of the present invention will be described below with reference to the accompanying drawings. Specific numerical values given in the following embodiments are illustrated by way of example to facilitate understanding of the present invention. Unless otherwise noted, the present invention is not limited to these values. In the following description and the accompanying drawings, the description of elements and the like which are obvious to those skilled in the art will be omitted or simplified as needed.

First Embodiment

Figure 1:
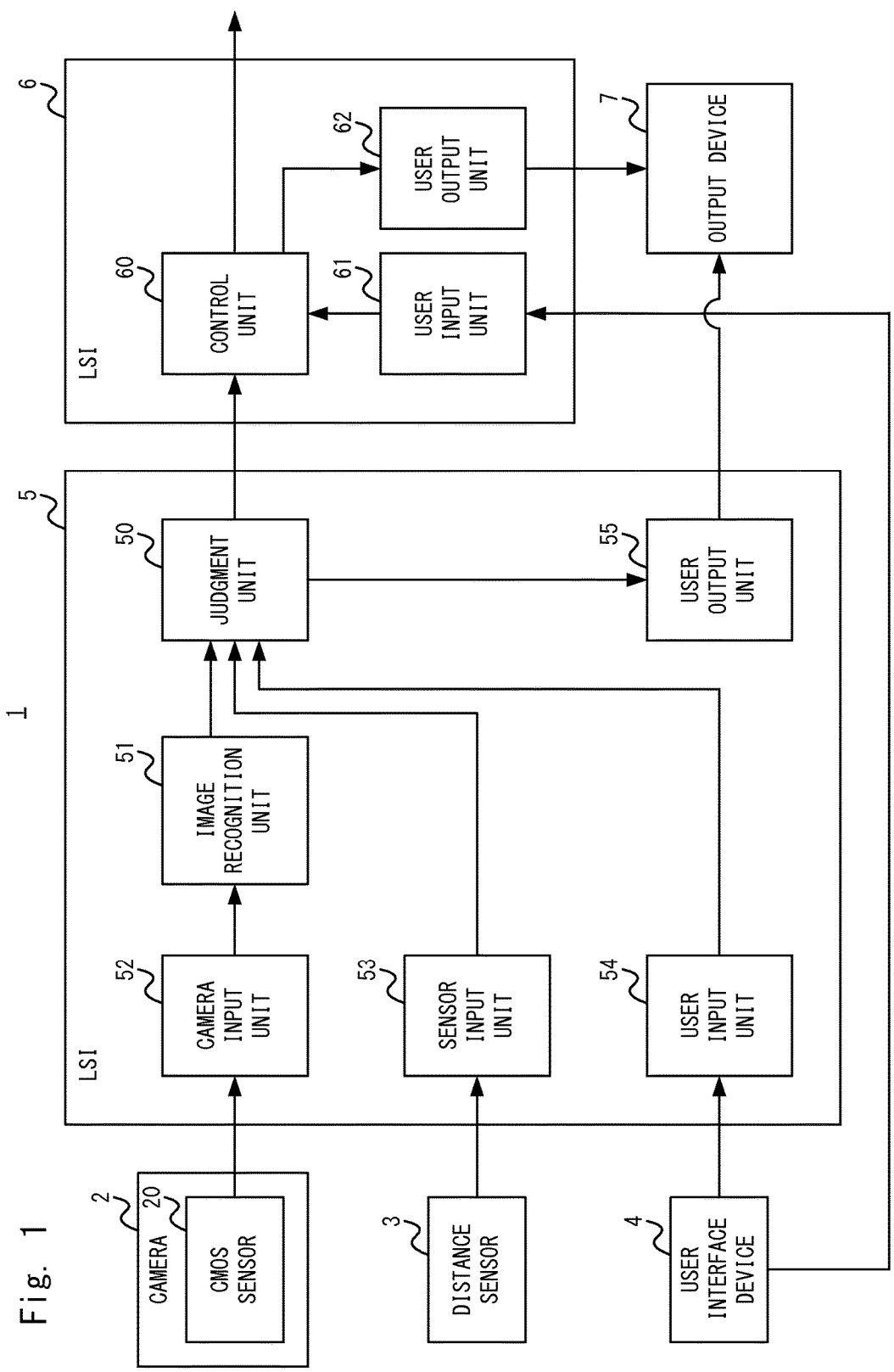
FIG. 1 is a block diagram showing an on-vehicle control system according to a first embodiment.

A first embodiment will be described. Referring first to FIG. 1, a system configuration of an on-vehicle control system 1 according to the first embodiment will be described. As shown in FIG. 1, the on-vehicle control system 1 includes a camera 2, a distance sensor 3, a user interface device 4, LSIs (Large Scale Integrations) 5 and 6, and an output device 7. The on-vehicle control system 1 is a system to be mounted on a vehicle. The vehicle on which the on-vehicle control system 1 is mounted is hereinafter referred to as "system-mounted vehicle".

The camera 2 is a device that captures an image of the periphery of the system-mounted vehicle. The camera 2 includes a CMOS sensor 20 (Complementary Metal Oxide Semiconductor). The CMOS sensor 20 captures an image of the periphery of the system-mounted vehicle to thereby generate image information indicating the image of the periphery of the system-mounted vehicle, and transmits the generated image information to the LSI 5.

The distance sensor 3 measures a distance from the system-mounted vehicle to an object present in the periphery of the system-mounted vehicle. The distance sensor 3 measures a distance from the system-mounted vehicle to an object, which is present in the periphery of the system-mounted vehicle, by, for example, electromagnetic waves such as light waves (including infrared rays, for example) and radio waves (including millimeter waves, for example). The distance sensor 3 generates distance information indicating the measured distance from the system-mounted vehicle to the object present in the periphery of the system-mounted vehicle, and transmits the generated distance information to the LSI 5.

The user interface device 4 is a device that receives an operation from a driver (user). The user interface device 4 is, for example, a steering wheel, an accelerator pedal, a brake pedal, and an operation switch. In this manner, the on-vehicle control system 1 typically includes a plurality of user interface devices 4. Each user interface device 4 generates operation information indicating the content of the operation according to the operation by the driver, and transmits the generated operation information to each of the LSI 5 and the LSI 6.

For example, when the steering wheel (including a steering angle sensor) is used as the user interface device 4, the steering angle sensor of the steering wheel detects the steering angle of the steering wheel according to the operation by the driver, and generates operation information indicating the detected steering angle. For example, when the accelerator pedal (including an accelerator pedal position sensor) is used as the user interface device 4, the accelerator pedal position sensor detects the amount of depression of the accelerator pedal according to the operation by the driver, and generates operation information indicating the detected depression amount. For example, when the brake pedal (including the brake pedal position sensor) is used as the user interface device 4, the brake pedal position sensor detects the amount of depression of the brake pedal by the operation by the driver, and generates operation information indicating the detected depression amount.

The LSI 5 is a semiconductor device that controls transfer of control modes of the vehicle in the on-vehicle control system 1 based on the information received from each of the camera 2, the distance meter 3, and the user interface device 4. In this case, the on-vehicle control system 1 includes, as control modes, a manual control mode for controlling the system-mounted vehicle according to the operation by the driver, and an automatic control mode for automatically controlling the system-mounted vehicle based on observation results from the camera 2 and the distance sensor 3. The LSI 5 includes a judgment unit 50, an image recognition unit 51, a camera input unit 52, a sensor input unit 53, a user input unit 54, and a user output unit 55.

The judgment unit 50 makes a judgment as to which control mode is used to operate the on-vehicle control system 1 based on the result of recognition by the image recognition unit 51 on the basis of the image information received from the camera 2, the distance information received from the distance sensor 3, and the operation information received from the user interface device 4. The judgment unit 50 transmits judgment result information indicating the judgment result to the LSI 6. Accordingly, as described later, the LSI 6 controls the system-mounted vehicle in the control mode according to the judgment result indicated by the judgment result information received from the judgment unit 50.

In the automatic control mode, the judgment unit 50 calculates a command value for specifying the control content of the system-mounted vehicle based on the recognition result from the image recognition unit 51 and the measurement result from the distance sensor 3, and transmits the calculated command value to the LSI 6. More specifically, in the automatic control mode, the judgment unit 50 calculates a travel route for the system-mounted vehicle to prevent the system-mounted vehicle from coming into contact with an object, based on the recognition result from the image recognition unit 51 and the measurement result from the distance sensor 3, and calculates a command value for the system-mounted vehicle to travel along the calculated travel route. In the automatic control mode, the judgment unit 50 can also calculate a command value for the system-mounted vehicle to stop in front of an object, to thereby prevent the system-mounted vehicle from coming into contact with the object.

In this case, the judgment unit 50 makes a judgment as to which control mode is used to operate the on-vehicle control system 1, for example, in the following manner. When the judgment unit 50 has received the operation information indicating that the operation switch for instructing switching of the control mode has been operated during the manual control mode, the judgment unit 50 judges that the control mode is to be transferred from the manual control mode to the automatic control mode. On the other hand, when the judgment unit 50 receives the operation information indicating that the operation switch for instructing switching of the control mode has been operated during the automatic control mode, the judgment unit 50 judges that the control mode is to be transferred from the automatic control mode to the manual control mode. Further, when the judgment unit 50 has recognized that one of the steering wheel, the accelerator pedal, the brake pedal, and the like has been operated during the automatic control mode, based on the operation information received from the steering wheel, the accelerator pedal, the brake pedal, and the like, the judgment unit 50 judges that the control mode is to be transferred from the automatic control mode to the manual control mode.

Furthermore, in this embodiment, when the judgment unit 50 has judged that the travel route to avoid contact with an object cannot be calculated, based on the recognition result from the image recognition unit 51 and the measurement result from the distance sensor 3, during the automatic control mode, the judgment unit 50 judges that risk factors cannot be removed and thus the control mode should be transferred from the automatic control mode to the manual control mode as a safer method. In this manner, an accurate transfer of control from the on-vehicle control system 1 to the driver can be achieved.

When the judgment unit 50 has judged that such risk factors that the system-mounted vehicle may contact an object if the system-mounted vehicle continues traveling cannot be removed, based on the recognition result from the image recognition unit 51 and the measurement result from the distance sensor 3, the judgment unit 50 judges that the control mode should be transferred from the manual control mode to the automatic control mode. Accordingly, even if the operation for braking the system-mounted vehicle is not carried out by the driver after the transfer of control from the on-vehicle control system 1 to the driver, the judgment unit 50 can instruct the LSI 6 to transfer the on-vehicle control system 1 from the manual control mode to the automatic control mode and to stop the system-mounted vehicle so as to avoid contact with an object. Thus, in this embodiment, the safety of the vehicle can be ensured even if the operation for braking the system-mounted vehicle is not carried out by the driver.

The image recognition unit 51 recognizes an object present in the periphery of the system-mounted vehicle and the motion of the object based on the image information received from the camera 2. The image recognition unit 51 outputs recognition result information indicating the recognition result to the judgment unit 50.

The camera input unit 52 receives the image information transmitted from the camera 2, and outputs the received image information to the image recognition unit 51. The sensor input unit 53 receives the distance information transmitted from the distance sensor 3, and outputs the received distance information to the image recognition unit 51. The user input unit 54 receives the operation information transmitted from the user interface device 4, and outputs the received operation information to the judgment unit 50. The user output unit 55 transmits the information, which is output from the judgment unit 50, to the output device 7.

The LSI 6 controls the system-mounted vehicle based on the information received from the user interface 4 or the judgment unit 50. The LSI 6 includes a control unit 60, a user input unit 61, and a user output unit 62.

The control unit 60 controls each part of the system-mounted vehicle. In the manual control mode, the control unit 60 controls each part of the system-mounted vehicle based on the user operation content indicated by the operation information received from the user interface device 4. On the other hand, in the automatic control mode, the control unit 60 controls each part of the system-mounted vehicle based on the command value received from the judgment unit 50.

The control unit 60 controls each part (for example, a tire turning angle, an engine speed, and adjustment of the brake) of the system-mounted vehicle. In this case, in the manual control mode, the control unit 60 controls the tire turning angle of the system-mounted vehicle according to the steering angle of the steering wheel indicated by the operation information received from the steering wheel. Further, in the manual control mode, the control unit 60 controls the engine speed of the system-mounted vehicle according to the amount of depression of the accelerator pedal indicated by the operation information received from the accelerator pedal. Furthermore, in the manual control mode, the control unit 60 controls the adjustment of the brake of the system-mounted vehicle according to the amount of depression of the brake pedal indicated by the operation information received from the brake pedal.

On the other hand, in the automatic control mode, the control unit 60 controls the tire turning angle, the engine speed, and the adjustment of the brake based on the command value received from the judgment unit 50. Accordingly, any form may be used as the command value as long as it is information capable of specifying the control content representing the state (the tire turning angle, the engine speed, and the adjustment of the brake) of each part of the system-mounted vehicle. For example, information that represents the steering angle of the steering wheel and the amount of depression of the accelerator pedal in a pseudo manner may also be used as the command value.

The user input unit 61 receives the operation information transmitted from the user interface device 4, and outputs the operation information to the control unit 60. The user output circuit 62 transmits the information, which is output from the control unit 60, to the output device 7.

The output device 7 is a device that outputs information to notify the driver of any notification content according to the instructions from the LSI 5 and the LSI 6. The output device 7 is, for example, a display device that displays information for the driver, a sound output device that outputs sound to the driver, or a device that performs these operations at the same time. The display device may be, for example, a display panel that displays an image indicating the notification content for the driver, or an LED (Light Emitting Diode) corresponding to the notification content for the driver. The sound output device may be, for example, a speaker.

Therefore, in the case of sending a notification to the driver, the judgment unit 50 and the control unit 60 transmit the information for instructing the notification to be sent to the output device 7 through the user output units 55 and 62. For example, in the case of using a display panel as the output device, when a notification of the transfer from the automatic control mode to the manual control mode is to be sent, the judgment unit 50 or the control unit 60 transmits, to the output device 7, image information indicating an image for sending a notification of the transfer from the automatic control mode to the manual control mode. Accordingly, the display panel displays the image indicated by the image information. For example, in the case of using an LED as the output device, when a notification of the transfer from the automatic control mode to the manual control mode is to be sent, the judgment unit 50 or the control unit 60 transmits, to the output device 7, information instructing that the LED be lit. For example, in the case of using a speaker as the output device, when a notification of the transfer from the automatic control mode to the manual control mode is to be sent, the judgment unit 50 or the control unit 60 transmits, to the output device 7, sound information indicating the sound for notifying of the transfer from the automatic control mode to the manual control mode. Accordingly, the speaker outputs the sound indicated by the sound information.

Figure 2:
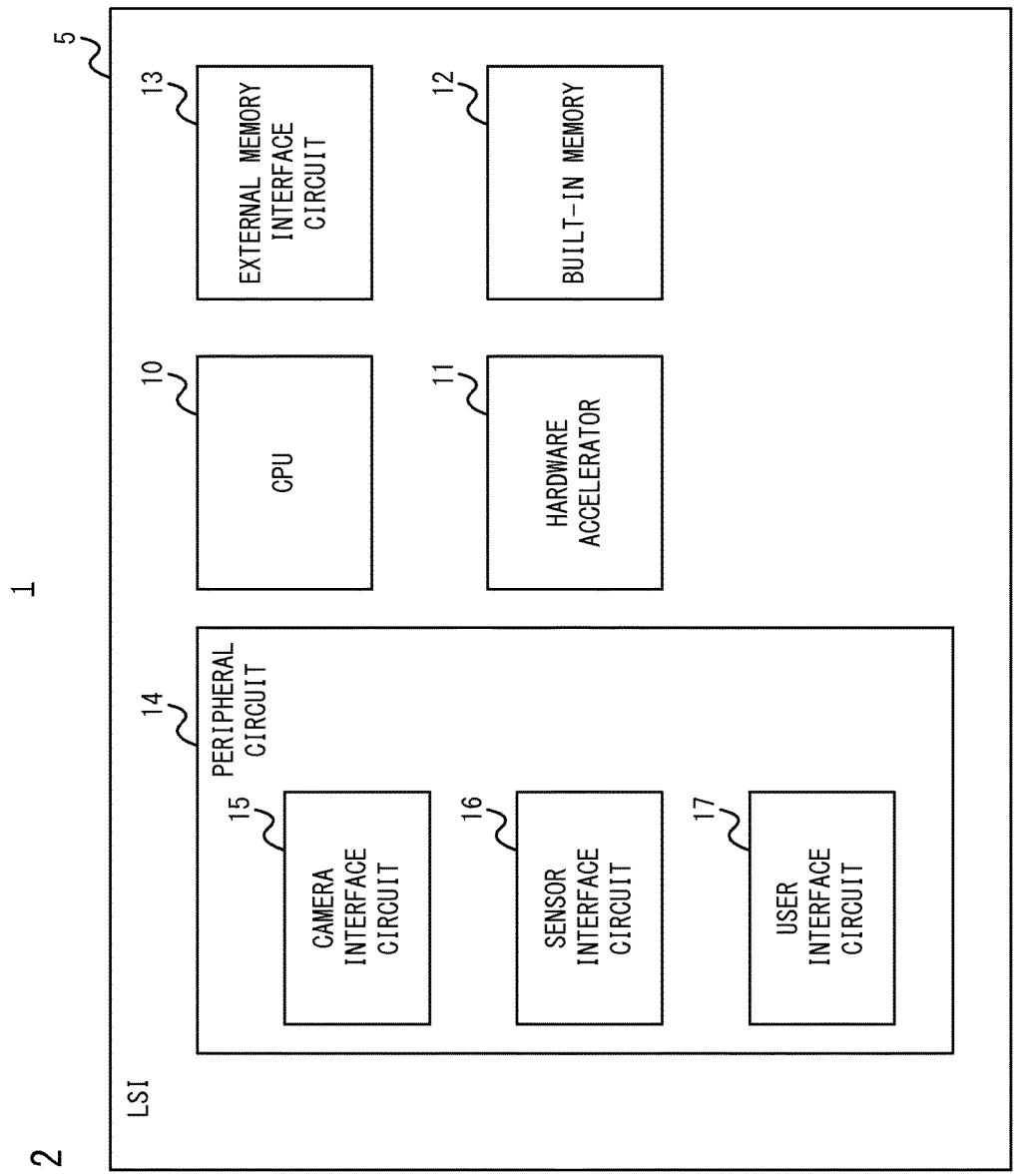
FIG. 2 is a hardware block diagram showing an LSI according to the first embodiment.

Referring next to FIG. 2, the hardware configuration of the LSI 5 according to the first embodiment will be described. As shown in FIG. 2, the LSI 5 includes a CPU (Central Processing Unit) 10, a hardware accelerator 11, a built-in memory 12, an external memory interface circuit 13, and a peripheral circuit 14. The peripheral circuit 14 includes a camera interface circuit 15, a sensor interface circuit 16, and a user interface circuit 17.

The CPU 10 functions as the judgment unit 50 and the image recognition unit 51. Specifically, the CPU 10 executes, for example, processing for recognizing an object in the periphery of the system-mounted vehicle based on the information from the camera 2 and the distance sensor 3, processing for judging the transfer of the control mode, and processing for calculating the command value to be output to the LSI 6.

The hardware accelerator 11 functions as the judgment unit 50 and the image recognition unit 51. The hardware accelerator 11 secondarily executes a part of the arithmetic processing in the CPU 10. For example, in the case of recognizing an object based on the image information, the hardware accelerator 11 executes a part of the arithmetic processing to analyze the image indicated by the image information. A GPU (Graphics Processing Unit) including a plurality of GPU cores, for example, may be used as the hardware accelerator 11.

The built-in memory 12 stores a program (software) including information used for the CPU 10 to execute processing and information for causing the CPU 10 to execute the above-mentioned processing. The CPU 10 executes the program stored in the built-in memory 12, thereby implementing the processing as the judgment unit 50 and the image recognition unit 51.

The external memory interface circuit 13 obtains information stored in an external memory (not shown), which is provided in the on-vehicle control system 1 on the outside of the LSI 5, and stores the obtained information in the built-in memory 12. For example, the above-mentioned program may be stored in advance in the external memory. In this case, the external memory interface circuit 13 obtains the program stored in the external memory and stores the obtained program in the built-in memory 12, thereby enabling the CPU 10 to execute the program.

The camera interface circuit 15 functions as the camera input unit 52. The camera interface circuit 15 receives the image information transmitted from the camera 2, and stores the received image information in the built-in memory 12. The sensor interface circuit 16 functions as the sensor input unit 53. The sensor interface circuit 16 receives the distance information transmitted from the distance sensor 3, and stores the received distance information in the built-in memory 12. The user interface circuit 17 functions as the user input unit 54 and the user output unit 55. The user interface circuit 17 receives the operation information transmitted from the user interface device 4, and stores the received operation information in the built-in memory 12. As a result, the CPU 10 (the judgment unit 50 and the image recognition unit 51) can use the image information, the distance information, and the operation information by referring to the built-in memory 12. In this case, the CPU 10 may be replaced by the hardware accelerator 11, and the built-in memory 12 may be replaced by the external memory.

Figure 3:
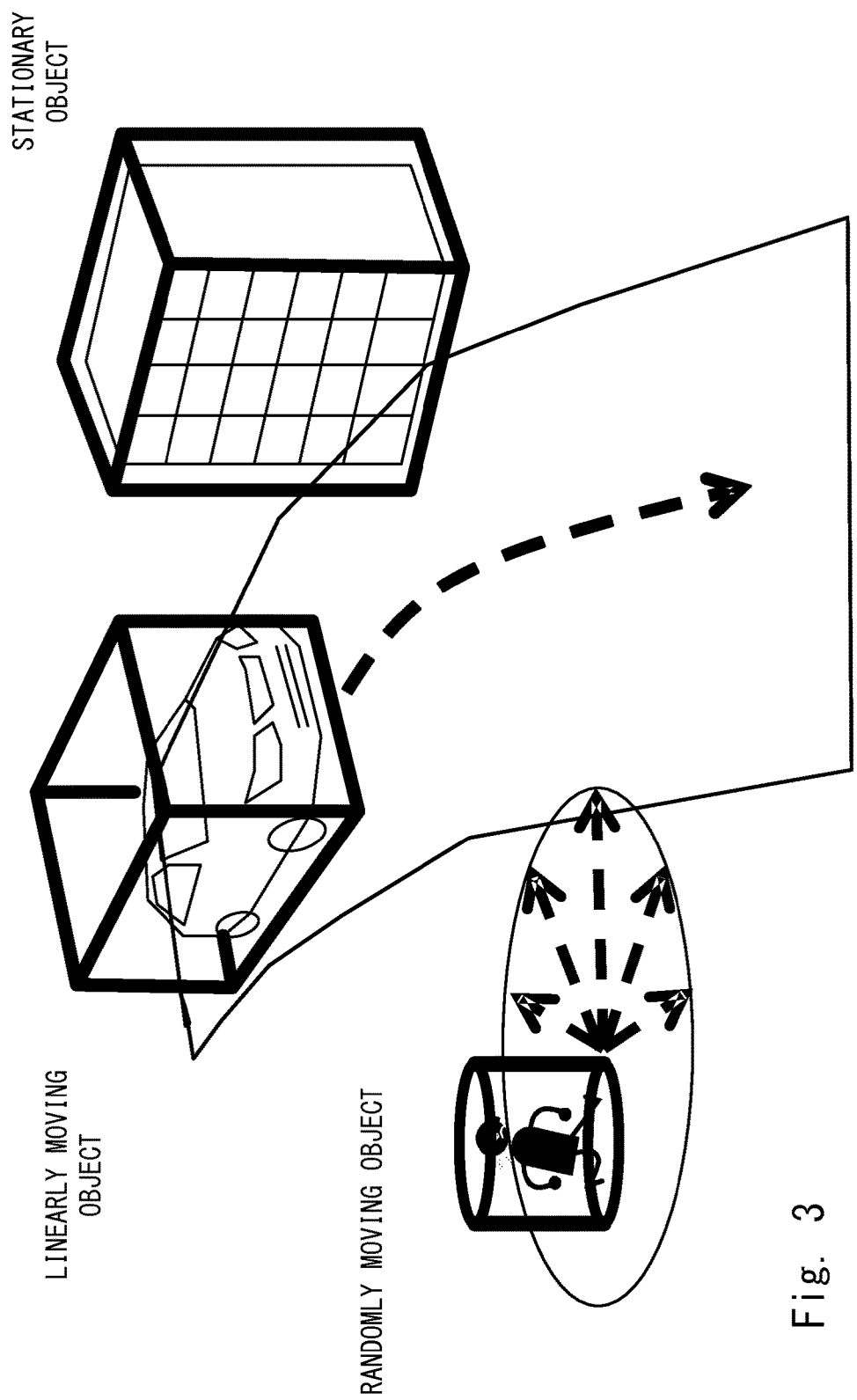
FIG. 3 is a view showing an example in which objects are categorized according to an embodiment.

Referring next to FIG. 3, an example of categorizing objects according to an embodiment will be described. The judgment unit 50 categorizes, based on the recognition result information from the image recognition unit 51, objects (recognized objects) as a stationary object and a moving object. The judgment unit 50 judges, based on the recognition result information from the image recognition unit 51, whether each object is a stationary object or a moving object. Further, the judgment unit 50 categorizes the moving objects as a linearly moving object and a randomly moving object. Specifically, as shown in FIG. 3, the judgment unit 50 categorizes the recognized objects as (1) a stationary object, (2) a linearly moving object, and (3) a randomly moving object.

The objects may be categorized using any typical techniques, such as a filter, an optical flow (motion vector), and pattern matching one. For example, when the difference between the direction of the motion (motion vector) of an object between a certain image (first image) and an image (second image), which is captured subsequent to the first image, and the direction of the motion (motion vector) of the object between the second image and an image (third image), which is captured subsequent to the second image, falls within a predetermined allowable range, it may be judged that the object is a linearly moving object. When the object is out of the allowable range, it may be judged that the object is a randomly moving object.

Referring next to FIGS. 4 to 8, a method for judging an override request will be described.

The judgment unit 50 judges whether or not the system-mounted vehicle can travel along the travel route that avoids each object, if the system-mounted vehicle continues traveling in the automatic control mode, based on the categorizing result of each object and the distance from each object. The judgment unit 50 recognizes the distance from each object based on the distance information from the distance sensor 3. A method for measuring the distance using the CMOS sensor 20, instead of the distance sensor 3, may be used. Specifically, a stereo camera using two CMOS sensors 20 is generally used. When the judgment unit 50 has judged that the system-mounted vehicle cannot travel along the travel route that avoids each object, the judgment unit 50 issues an override request for requesting the transfer from the automatic control mode to the manual control mode. Further, the judgment unit 50 calculates a timing for issuing the override request and issues the override request at the calculated timing.

In the case of judging whether or not the system-mounted vehicle can travel along the travel route that avoids each object, the judgment unit 50 creates a map by mapping a distribution of probabilities of existence representing the probability that an object exists in the peripheral area of the system-mounted vehicle, and calculates a travel route for the system-mounted vehicle based on the distribution of probabilities of existence. This map may be, for example, a bird's eye view map (a planar view of the peripheral area of the system-mounted vehicle when viewed from above). This map is held in such a manner that, for example, the judgment unit 50 stores the map in the built-in memory 12 as map information.

An example in which the probability that an object exists is represented by a probability of existence will now be described. In this case, a maximum value of the probability of existence is represented by 100% and a minimum value of the probability of existence is represented by 0%. However, the form of the probability of existence is not limited to the probability that an object exists, as long as the probability of existence represents a value that varies depending on the probability that an object exists.

In this case, the judgment unit 50 sets the distribution of probabilities of existence on the map as follows.

Regarding the stationary object (1)

In an area in which a stationary object exists, the maximum value (100%) of the probability of existence is set.

Regarding the moving objects (2) and (3)

In an area in which a moving object is likely to move, the probability of existence is set depending on the category of the moving object and the distance from the system-mounted vehicle to the area.

Since the stationary object always exists at the location without moving, the probability of existence is set in such a manner that the value of the probability of existence is larger in the area in which a stationary object exists, than in the area in which a moving object is likely to move.

In this case, the judgment unit 50 determines the area in which a moving object is likely to move, for example, in the following manner.

(2) Linearly moving object: A radial area extending from the object in the movement direction of the object; a band-like area extending from the object in the movement direction of the object; or a circular area placed in front of the movement direction of the object.

(3) Randomly moving object: A circular area centered on the object.

Figure 4A:
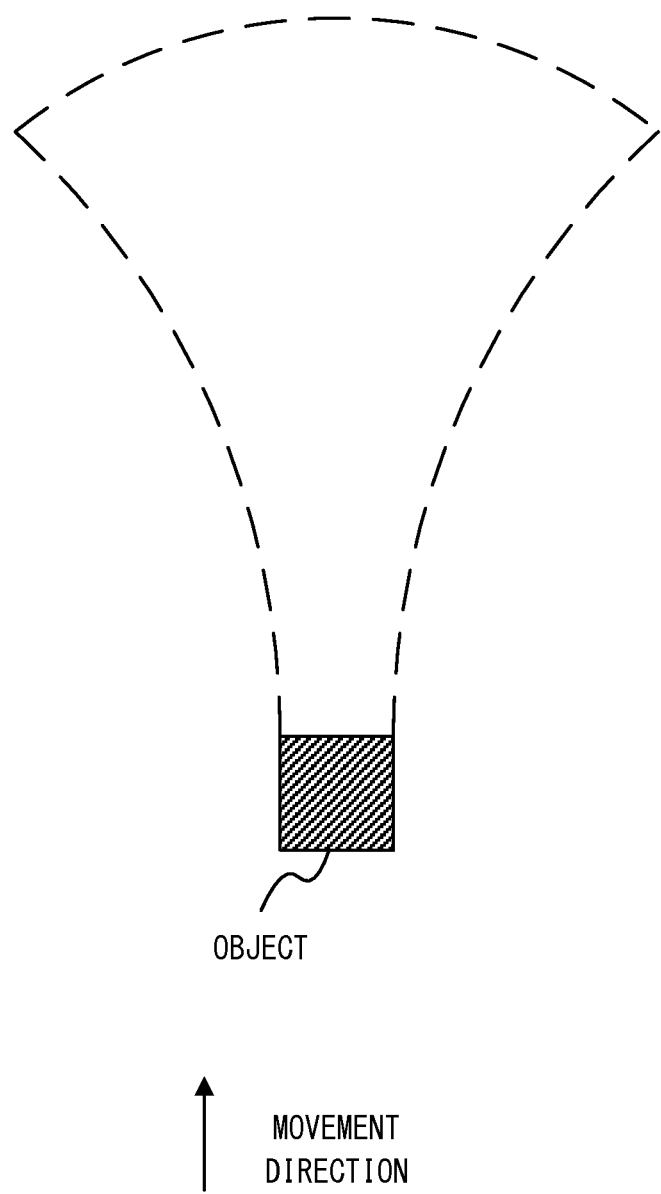
FIG. 4A is a diagram illustrating an area in which a moving object (linearly moving object) is likely to move.
Figure 4B:
FIG. 4B is a diagram showing an example of an area in which a moving object (linearly moving object) is likely to move.

Referring first to FIGS. 4A to 4C, the linearly moving object will be described. The radial area extending from the object in the movement direction of the object is placed in, for example, the shape shown in FIG. 4A. This area is placed in such a manner that the width of the area increases in a direction away from the object. The curvature of each of right and left curved portions in the movement direction of the object may be determined to be a predetermined value, or it may be determined that the curvature increases as the speed of the object (for example, the magnitude of the motion vector) decreases. The speed of the object can be specified by the motion of the object (for example, the magnitude of the motion vector). Further, the length in the movement direction of the object may be determined to be a predetermined value, or it may be determined that the length increases as the speed of the object increases.

The band-like area extending from the object in the movement direction of the object is placed in, for example, the shape shown in FIG. 4B. The length in the movement direction of the object may be determined to be a predetermined value, or it may be determined that the length increases as the speed of the object increases. The length in the direction perpendicular to the movement direction of the object may be determined to be a predetermined value, or it may be determined that the length decreases as the speed of the object increases.

The circular area placed in front of the movement direction of the object is placed in, for example, the shape shown in FIG. 4C. The length in the movement direction of the object may be determined to be a predetermined value, or it may be determined that the length increases as the speed of the object increases. The length in the direction perpendicular to the movement direction of the object may be determined to be a predetermined value, or it may be determined that the length decreases as the speed of the object increases. While FIG. 4C illustrates a case where the area has an elliptical shape, the circular shape may instead be a round shape or an elliptical shape.

Figure 5A:
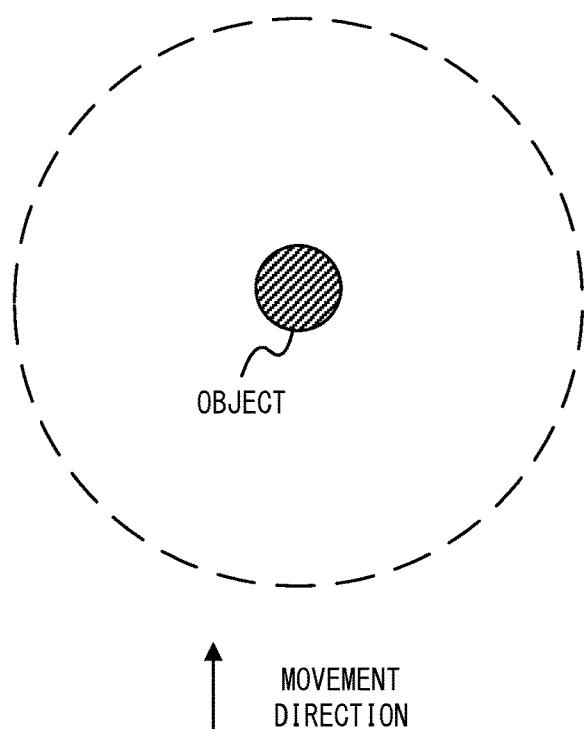
FIG. 5A is a diagram showing an example of an area in which a moving object (randomly moving object) is likely to move.
Figure 5B:
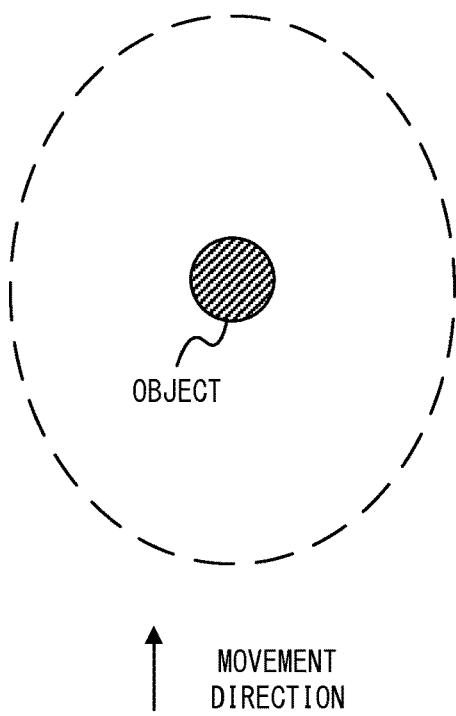
FIG. 5B is a diagram showing an example of an area in which a moving object (randomly moving object) is likely to move.

Referring next to FIGS. 5A to 5B, the randomly moving object will be described. The circular area centered on the object is placed in, for example, a round shape as shown in FIG. 5A. In this case, the radius of the area may be determined to be a predetermined value, or it may be determined that the radius increases as the speed of the object increases. The circular area centered on the object may also be placed in, for example, an elliptical shape as shown in FIG. 5B. In this case, the length in the movement direction of the object may be determined to be a predetermined value, or it may be determined that the length increases as the speed of the object increases. In this case, the length in the direction perpendicular to the movement direction of the object may be determined to be a predetermined value, or it may be determined that the length decreases as the speed of the object increases.

Next, a method for determining the probability of existence in an area in which a moving object is likely to move will be described. First, the judgment unit 50 determines an initial value for the probability of existence according to the distance from the system-mounted vehicle to the area.

The judgment unit 50 determines the radial area extending from the system-mounted vehicle in the traveling direction thereof as a movable area of the system-mounted vehicle as illustrated in FIG. 6. The probability of existence for the area in which a moving object is likely to move is determined in the movable area, for example, in the following manner.

100% is set as the probability of existence for an area located at a distance less than a distance R1.

70% is set as the probability of existence for an area located at a distance less than a distance R2 (excluding the area located at a distance less than the distance R1).

40% is set as the probability of existence for an area located at a distance less than a distance R3 (excluding the area located at a distance less than the distance R2).

20% is set as the probability of existence for an area located at a distance equal to or more than a distance R3 (excluding the area located at a distance less than the distance R3).

That is, the probability of existence is determined in such a manner that the value of the probability of existence increases as the distance from the system-mounted vehicle to the object decreases. For example, the distance R2 is set to be longer than the distance R1, and the distance R3 is set to be longer than the distance R2. The distances R1 to R3 may be determined in advance, or may be dynamically changed according to the speed of the system-mounted vehicle. For example, the judgment unit 50 may determine, based on the speed of the system-mounted vehicle, the distance R1 as a distance to be reached by the system-mounted vehicle in X1 seconds; the distance R2 as a distance to be reached by the system-mounted vehicle in X2 seconds; and the distance R3 as a distance to be reached by the system-mounted vehicle in X3 seconds (X3>X2>X1). The judgment unit 50 may obtain the speed of the system-mounted vehicle by any method. For example, the judgment unit 50 obtains angle information indicating the rotation angle of the axle from an axle sensor (not shown) of the system-mounted vehicle through the sensor input unit 53, and calculates the speed of the system-mounted vehicle based on the rotation angle indicated by the obtained angle information.

In this case, when a moving object is present at a location close to the system-mounted vehicle, it takes a short period of time for the system-mounted vehicle to reach the location. Accordingly, it is highly likely that the moving object will not move a long distance when the system-mounted vehicle reaches the location. On the other hand, when a moving object is present at a location far from the system-mounted vehicle, it takes a long period of time for the system-mounted vehicle to reach the location. Accordingly, it is highly likely that the system-mounted vehicle will move a long distance when the system-mounted vehicle reaches the location. Therefore, as described above, the probability of existence of the moving object is determined in such a manner that the value of the probability of existence increases as the distance from the system-mounted vehicle to the moving object decreases and the value of the probability of existence decreases as the distance from the system-mounted vehicle to the moving object increases.

Next, when the judgment unit 50 determines the probability of existence for the area in which the moving object is likely to move, according to the distance from the system-mounted vehicle to the moving object, the judgment unit 50 determines the final probability of existence by adjusting the probability of existence according to the category of the moving object.

The judgment unit 50 determines the final probability of existence by multiplying a coefficient according to the category of the moving object by the probability of existence. As for the coefficient according to the category of the moving object, any value may be determined in advance. For example, "2" may be set for the linearly moving object, and "3" may be set for the randomly moving object. Since it is difficult to predict the movement destination of the randomly moving object, as compared with the linearly moving object, the coefficient for the randomly moving object may be set to be larger than that for the linearly moving object. This results in setting the travel route of the system-mounted vehicle to be inclined to the safe side so as to avoid contact with the randomly moving object, thereby making it possible to more reliably ensure the safety of the vehicle.

When areas in which different moving objects are likely to move overlap each other, the judgment unit 50 may adopt a higher one of the probabilities of existence of the overlapping areas as the final probability of existence, or may adopt a value obtained by adding the probabilities of existence of the overlapping areas as the final probability of existence. When the added value exceeds a maximum value, the probability of existence may be rounded to the maximum value.

The judgment unit 50 calculates a line (travel route) along which the system-mounted vehicle can travel while avoiding each object, according to the distribution of the final probabilities of existence on the map. The judgment unit 50 performs a simulation in which an object representing the system-mounted vehicle is caused to travel on a map, thereby judging whether or not it is possible to calculate a line along which the object representing the system-mounted vehicle can travel, without overlapping areas in which the probability of existence equal to or more than a predetermined threshold is set. The above-mentioned judgment is made after mapping these areas and the object representing the system-mounted vehicle on, for example, a map which is divided into a grid of segments.

When the judgment unit 50 judges that the line along which the system-mounted vehicle can travel can be calculated, the judgment unit 50 generates a command value for instructing the system-mounted vehicle to travel along the calculated line, and transmits the generated command value to the LSI 6. In other words, the control of the system-mounted vehicle in the automatic control mode is continued.

Figure 7:
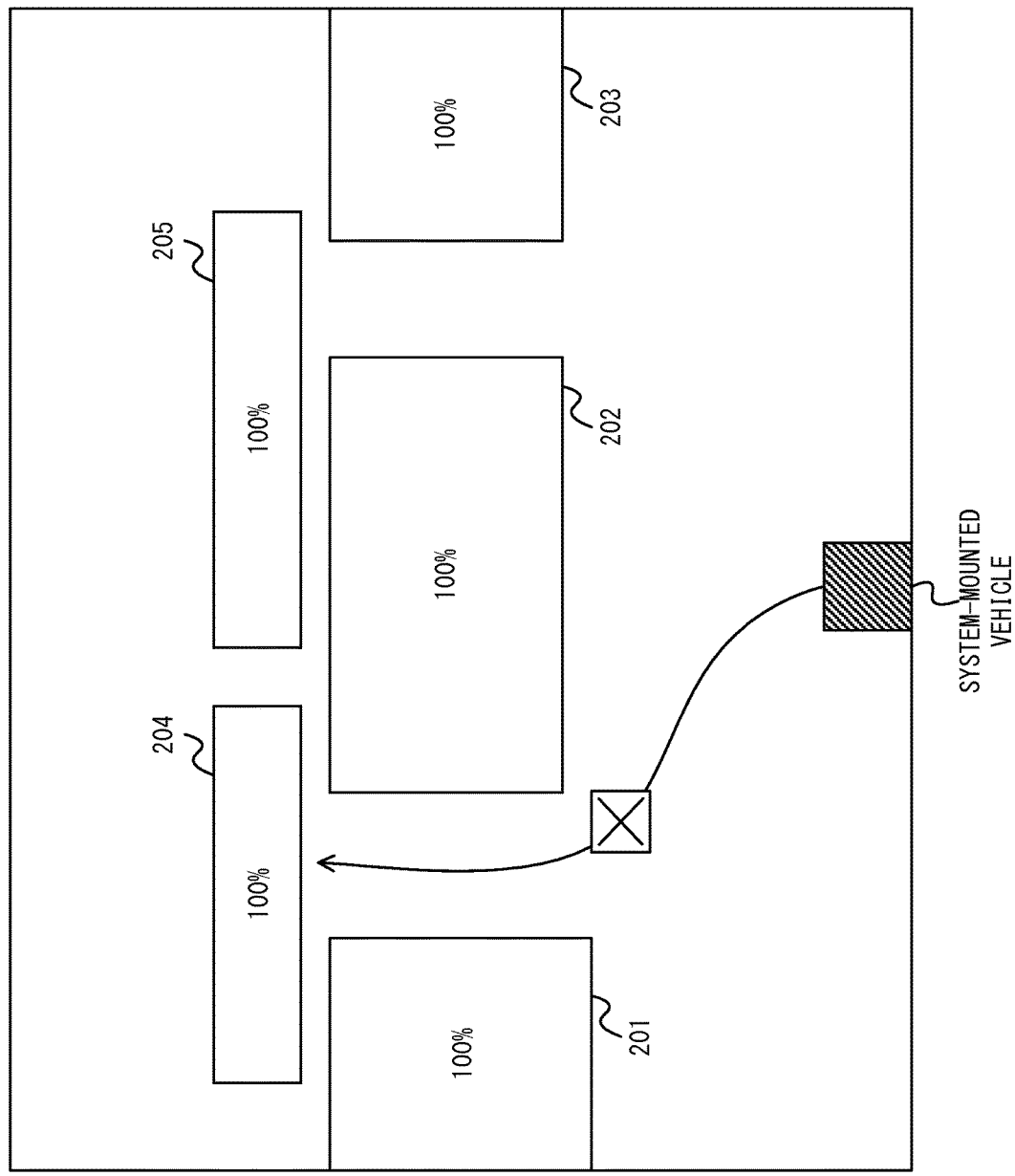
FIG. 7 is a diagram showing an example of a map in which an available travel line cannot be calculated.
Figure 8:
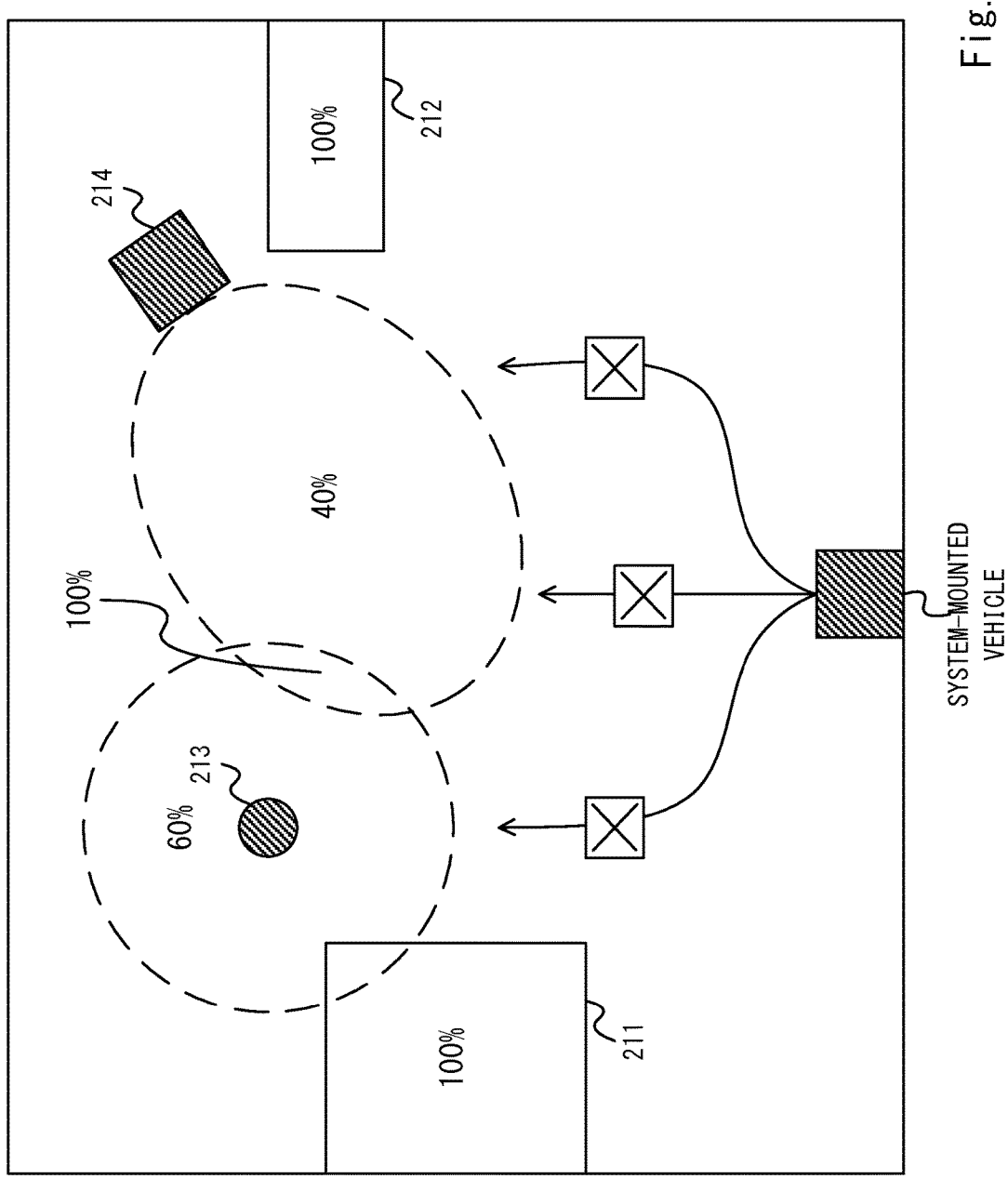
FIG. 8 is a diagram showing an example of a map in which an available travel line cannot be calculated.

On the other hand, when the judgment unit 50 judges that the line along which the system-mounted vehicle can travel cannot be calculated, the judgment unit 50 issues the override request to leave the driving of the system-mounted vehicle to the driver. Referring now to FIGS. 7 and 8, an example of the situation in which it is judged that the line along which the system-mounted vehicle can travel cannot be calculated will be described. Assume herein that the threshold is 40%.

FIG. 7 shows an example of the map on which only stationary objects 201 to 205 are present and the line along which the system-mounted vehicle can travel cannot be calculated. The areas in which the stationary objects 201 to 205 are present are placed in a plurality of grids according to the shape of the objects recognized as the stationary objects 201 to 205. In these grids, the probability of existence is set to 100%. The system-mounted vehicle is also placed in a predetermined plurality of grids. In the example shown in FIG. 7, assume that the interval between the stationary object 201 and the stationary object 202 and the interval between the stationary object 202 and the stationary object 203 are wider than the width of the system-mounted vehicle. On the other hand, assume that the interval between the stationary object 204 and each of the stationary objects 201 and 202 and the interval between the stationary object 205 and each of the stationary objects 202 and 203 are narrower than the width of the system-mounted vehicle. In this case, the judgment unit 50 verifies a plurality of patterns for causing the system-mounted vehicle to travel. Whichever travel route the system-mounted vehicle takes, the travel route overlaps any of the areas in which the stationary objects 201 to 205 are present. In other words, whichever travel route the system-mounted vehicle takes, the travel route overlaps an area with a value equal to or more than the threshold (40%). Accordingly, in this case, the judgment unit 50 judges that the line along which the system-mounted vehicle can travel cannot be calculated.

FIG. 8 shows an example of the map on which stationary objects 211 and 212 and moving objects 213 and 214 are present and the line along which the system-mounted vehicle can travel cannot be calculated. Areas in which the stationary objects 211 and 212 are present and areas in which the moving objects 213 and 214 are likely to move are placed in a plurality of grids according to the shape of the recognized objects. The probability of existence in the grids for the areas in which the stationary objects 211 and 212 are present is set to 100%. Assume that in the areas in which the moving objects 213 and 214 are likely to move, the probability of existence for the area in which the linearly moving object 214 is likely to move is set to 40% and the probability of existence for the area in which the randomly moving object 213 is likely to move is set to 60%. For example, when these areas are present in the area located at a distance less than the distance R3 in the example of the coefficient and the probability of existence according to the distance, such a probability of existence is calculated. In this case, in the area where the area in which the linearly moving object 214 is likely to move overlaps the area in which the randomly moving object 213 is likely to move, 100% is set as a value obtained by adding the probabilities of existence of these areas. The system-mounted vehicle is also placed in a predetermined plurality of grids. In the example shown in FIG. 8, assume that there is no gap between the area in which the stationary object 211 is present and the area in which the moving object 214 is likely to move, and there is no gap between the area in which the moving object 213 is likely to move and the area in which the moving object 214 is likely to move. Also assume that the interval between the area in which the moving object 214 is likely to move and the area in which the stationary object 211 is present is narrower than the width of the system-mounted vehicle. In this case, the judgment unit 50 verifies a plurality of patterns for causing the system-mounted vehicle to travel. Whichever travel route the system-mounted vehicle takes, the travel route overlaps any of the areas in which the stationary objects 211 and 212 are present or the areas in which the moving objects 213 and 214 are likely to move. In other words, whichever travel route the system-mounted vehicle takes, the travel route overlaps an area with a value equal to or more than the threshold (40%). Accordingly, also in this case, the judgment unit 50 judges that the line along which the system-mounted vehicle can travel cannot be calculated.

When the judgment unit 50 judges that the line along which the system-mounted vehicle can travel cannot be calculated, the judgment unit 50 issues the override request for transfer from the automatic control mode to the manual control mode.

Figure 9:
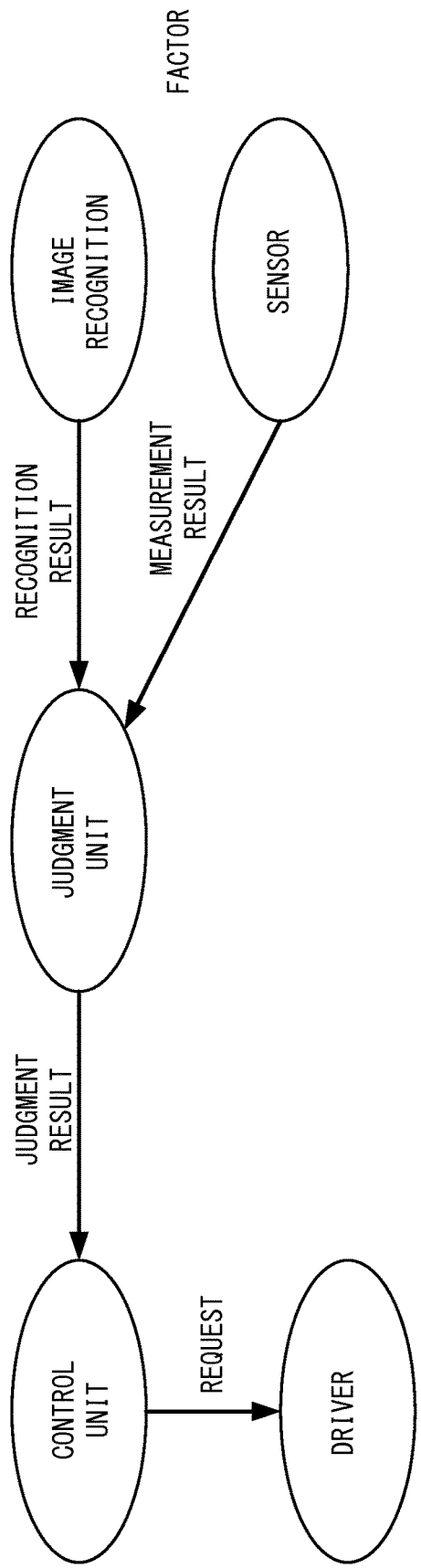
FIG. 9 is a relationship diagram showing elements associated with issuance of an override request according to the first embodiment.
Figure 10:
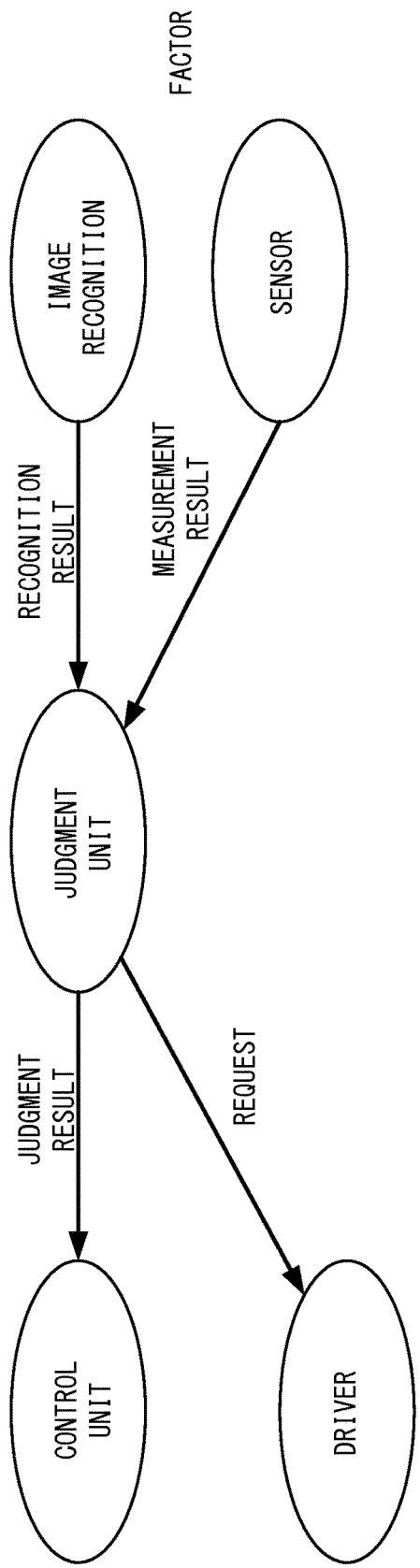
FIG. 10 is a relationship diagram showing elements associated with issuance of the override request according to the first embodiment.

Referring next to FIGS. 9 and 10, relations between elements associated with issuance of the override request will be described. The override request may be issued in the mode shown in FIG. 9, or may be issued in the mode shown in FIG. 10.

First, an example illustrated in FIG. 9 will be described. As described above, the judgment unit 50 judges whether or not it is necessary to issue the override request, based on the recognition result from the image recognition unit 51 and the measurement result from the distance sensor 3. When the judgment unit 50 judges that the override request is to be issued, the judgment unit 50 notifies the control unit 60 of the judgment result indicating that the control mode is transferred from the automatic control mode to the manual control mode as the override request. In response to the notification of the judgment result from the judgment unit 50, the control unit 60 stops the control of the vehicle in the automatic control mode and starts the control of the vehicle in the manual control mode. Further, in response to the notification of the judgment result, the control unit 60 causes the output device 7 to output, as the override request, a notification to request the driver to drive the vehicle. This request corresponds to the notification that the control mode is transferred from the automatic control mode to the manual control mode.

Next, an example shown in FIG. 10 will be described. As described above, the judgment unit 50 judges whether or not it is necessary to issue the override request, based on the recognition result from the image recognition unit 51 and the measurement result from the distance sensor 3. When the judgment unit 50 judges that the override request is to be issued, the judgment unit 50 notifies the control unit 60 of the judgment result as the override request. The control unit 60 stops the control of the vehicle in the automatic control mode and starts the control of the vehicle in the manual control mode according to the override request. Further, when the judgment unit 50 judges that the override request is to be issued, the judgment unit 50 causes the output device 7 to output, as the override request, the notification to request the driver to drive the vehicle.

In this manner, the notification that the control mode is transferred from the automatic control mode to the manual control mode may be sequentially transmitted to the control unit 60 and the driver as the override request as shown in FIG. 9, or the notification that the control mode is transferred from the automatic control mode to the manual control mode may be transmitted to the control unit 60 and the driver in parallel as shown in FIG. 10. When the override request is issued as shown in FIG. 10, the notification that the control mode is transferred from the automatic control mode to the manual control mode (request for the driver to drive the vehicle) is transmitted to the driver without involving the control unit 60, thereby making it possible to more rapidly respond to the driver.

Next, a method for calculating the timing for issuing the override request will be described. Even when the line along which the system-mounted vehicle can travel while avoiding each object cannot be calculated, the judgment unit 50 calculates a typical line (travel route) along which the system-mounted vehicle travels, and calculates a time required for the system-mounted vehicle to reach an object when the system-mounted vehicle travels along the line. In this case, the time required for the system-mounted vehicle to reach an object may be, for example, a time required for the system-mounted vehicle to reach an area in which the object is present. If the object is a moving object, the time required for the system-mounted vehicle to reach the object may be a time required for the system-mounted vehicle to reach an area in which the object is likely to move.

A total amount of time in advance of a time at which the vehicle is estimated to reach the object, the judgment unit 50 issues the override request. The total amount of time includes a preparation time defined as a time required for the driver to start operating the vehicle so as to brake the vehicle after issuance of the override request, and a braking time defined as a time required for the vehicle to be stopped according to the operation. The total amount of time is hereinafter referred to as "threshold amount of time for issuance of the override request". The judgment unit 50 may calculate the time required for the system-mounted vehicle to reach the object according to, for example, the distance from the object and the speed of the system-mounted vehicle based on the angle information from the axle sensor. In this case, the preparation time includes a reserved time and a driver's operation time. The reserved time refers to a reaction time from the issuance of the override request to the state in which the driver is ready to drive. The driver's operation time refers to a reaction time from the state in which the driver is ready to drive to the start of the operation. In other words, the reserved time corresponds to the time required for the driver to recognize the issuance of the override request by the notification from the output device 7.

Figure 11:
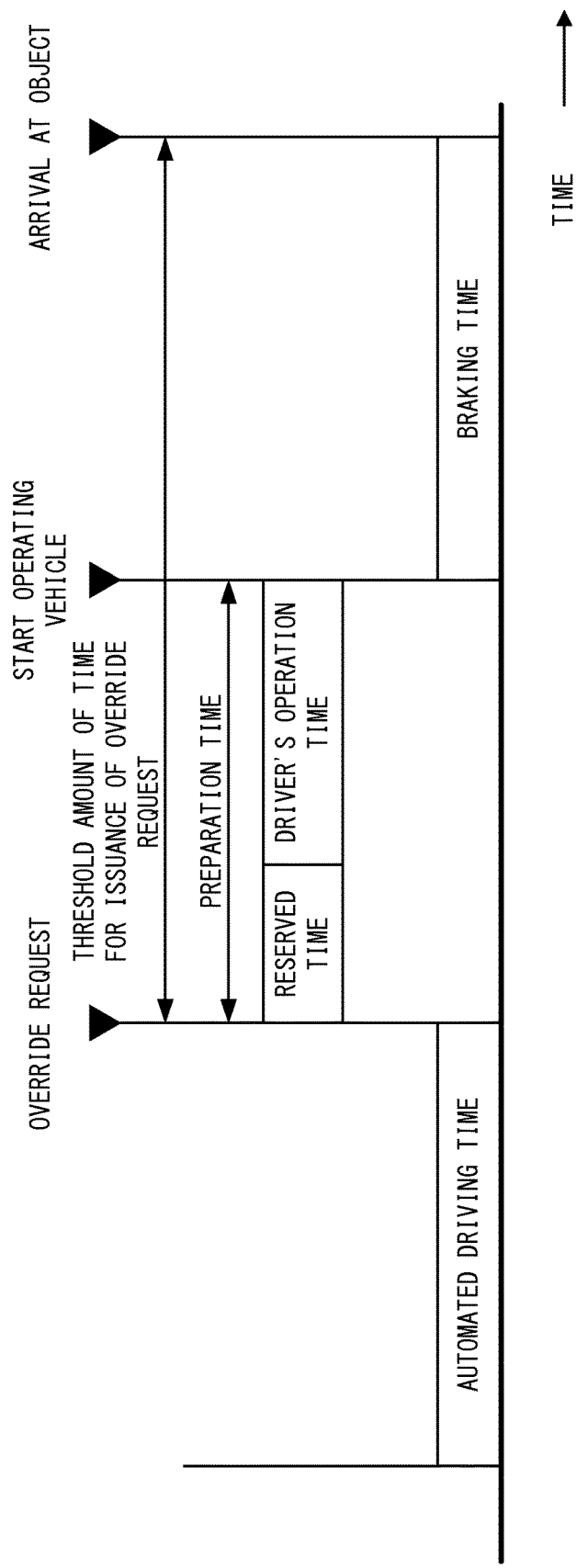
FIG. 11 is a timing diagram when the override request is issued.

The judgment unit 50 may issue the override request at any timing, as long as the override request is issued the threshold amount of time for issuance of the override request in advance of a time at which the system-mounted vehicle is estimated to reach the object. Typically, as shown in FIG. 11, the judgment unit 50 issues the override request at a time before the threshold amount of time for issuance of the override request. Technically, each of the above-mentioned reserved time, driver's operation time, and braking time is determined to be a time with a margin so that the braking time ends in advance of the time at which the system-mounted vehicle reaches the object (i.e., the system-mounted vehicle is stopped in front of the object) in the case where the braking control is actually performed. The threshold amount of time for issuance of the override request is calculated by the following Expressions (1) to (3).

$$\text{(braking distance)} = \text{(multiple of system-mounted vehicle speed (Km/h) before braking)}/(254 \times \text{friction coefficient of road surface}) \quad (1)$$

$$\text{(braking time)} = 2 \times \text{(braking distance/system-mounted vehicle speed)} \quad (2)$$

$$\text{(threshold amount of time for issuance of override request)} = \text{(reserved time)} + \text{(driver's operation time)} + \text{(braking time)} \quad (3)$$

The braking distance calculated by Expression (1) is a distance required to stop or avoid the object by braking the system-mounted vehicle. As described above, the speed of the system-mounted vehicle may be calculated based on, for example, the angle information from the axle sensor.

The friction coefficient between the system-mounted vehicle and the road surface varies depending on the speed of the system-mounted vehicle, characteristics of the system-mounted vehicle (for example, characteristics of tires), and the state of the road surface. Accordingly, the friction coefficient may be determined to be a predetermined value. Preferably, the friction coefficient may be dynamically calculated as described below.

Figure 12:
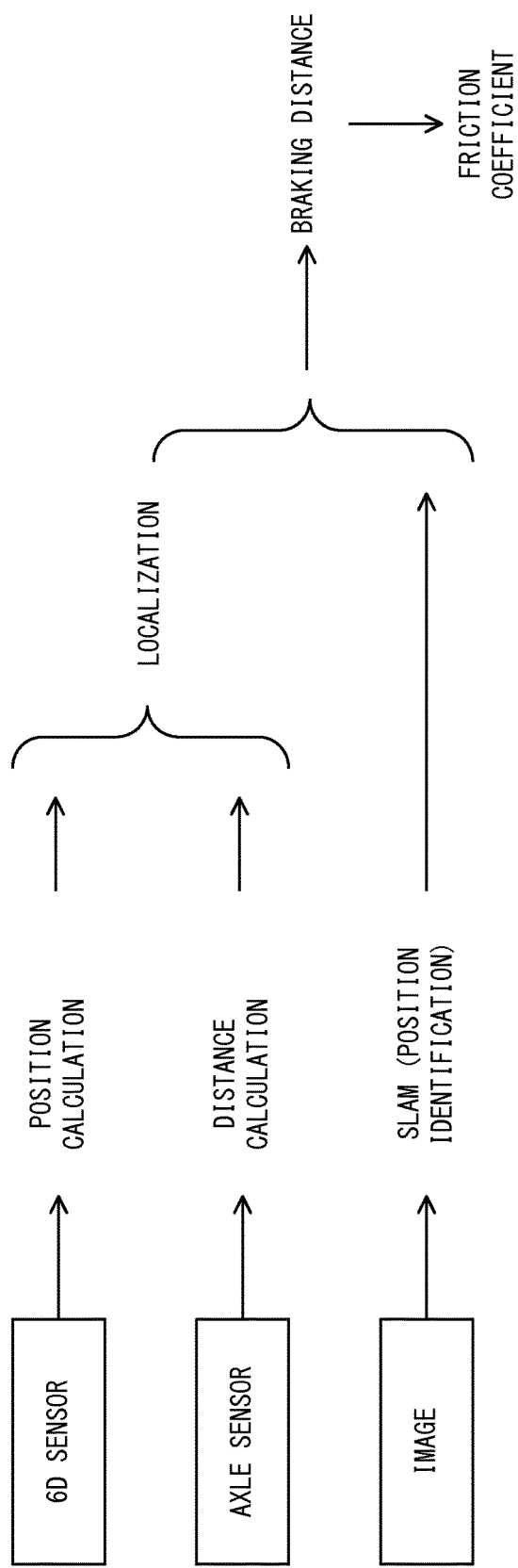
FIG. 12 is a conceptual diagram showing a flow of processing during calculation of a friction coefficient.

Next, a method for calculating the friction coefficient will be described. FIG. 12 is a conceptual diagram showing a flow of processing during calculation of the friction coefficient. When the control for braking the system-mounted vehicle is performed, the judgment unit 50 calculates the braking distance and the speed of the system-mounted vehicle at that time, and calculates the actual friction coefficient based on the calculated braking distance and the calculated speed of the system-mounted vehicle. The speed obtained when the control for braking the system-mounted vehicle is started is used as the speed of the system-mounted vehicle. Further, the judgment unit 50 calculates the braking distance as a distance from a position where the control for braking the system-mounted vehicle is started to a position where the system-mounted vehicle is stopped by the control. In the manual control mode, the judgment unit 50 may detect the time at which the control for braking the system-mounted vehicle is started, as the time at which the start of the operation for braking is detected based on the operation information transmitted from the brake. In the automatic control mode, the judgment unit 50 may detect the time at which the control for braking the system-mounted vehicle is started, as the time at which the transmission of the command value for controlling the brake to brake the system-mounted vehicle so as to stop the vehicle is started. Furthermore, the judgment unit 50 may detect the time at which the system-mounted vehicle is stopped, as the time at which the speed of the system-mounted vehicle becomes 0.

As shown in FIG. 12, for example, the information from the axil sensor, a 6D sensor (not shown), and the camera 2 is used for calculation of the position of the system-mounted vehicle.

The 6D sensor is a sensor having a configuration in which a GPS (Global Positioning System), a triaxial acceleration sensor, and a triaxial geomagnetic sensor are integrated as one. The 6D sensor transmits, to the LSI 5, positional information indicating the position of the system-mounted vehicle measured by the function of the GPS, acceleration information on the system-mounted vehicle in three axial directions measured by the function of the triaxial acceleration sensor, and geomagnetic information indicating the geomagnetism in the three axial directions for specifying the direction of the system-mounted vehicle measured by the function of the triaxial geomagnetic sensor. The judgment unit 50 obtains the positional information, which is transmitted from the 6D sensor, through the sensor input unit 53, and calculates, as the position of the system-mounted vehicle, the position indicated by the obtained positional information. Further, the judgment unit 50 updates the position of the system-mounted vehicle based on a travel distance calculated by the axle sensor as described below during the interval in which the positional information is obtained by the GPS.

As described above, the axle sensor transmits, to the LSI 5, the angle information indicating the rotation angle of the axle of the system-mounted vehicle. The judgment unit 50 obtains the angle information, which is transmitted from the axle sensor, through the sensor input unit 53, and calculates the speed of the system-mounted vehicle based on the rotation angle of the axle indicated by the obtained angle information. Then the judgment unit 50 calculates the travel distance by integrating the calculated speed of the system-mounted vehicle.

Based on the recognition result from the image recognition unit 51, the judgment unit 50 estimates the position of the vehicle by SLAM (Simultaneous Localization And Mapping) and performs a position comparison using a map (position identification). The judgment unit 50 corrects the position of the system-mounted vehicle, which is calculated based on the information from the axle sensor and the 6D sensor, to a more accurate position based on a relative position of the system-mounted vehicle with respect to each object in the periphery of the system-mounted vehicle, and calculates the corrected position of the system-mounted vehicle as the final position of the system-mounted vehicle.

The calculation of the position of the system-mounted vehicle is not limited to the calculation using all of the travel distance based on the information from the axle sensor, the position based on the information from the 6D sensor, and the position obtained by SLAM. The position of the system-mounted vehicle may be calculated using at least one of the above-mentioned techniques, or other techniques, as long as the position of the system-mounted vehicle can be calculated with an accuracy that enables calculation of the friction coefficient.

The judgment unit 50 performs a back-calculation of the friction coefficient from the braking distance and the speed of the system-mounted vehicle which are calculated by Expression (1). In this manner, the friction coefficient is calculated every time the control for braking the system-mounted vehicle is performed, and the friction coefficient used for calculation of the braking distance is updated as needed.

The judgment unit 50 calculates the braking distance by Expression (1) using the friction coefficient calculated as described above. Next, the judgment unit 50 calculates the braking time by Expression (2) using the calculated braking distance. The judgment unit 50 calculates the threshold amount of time for issuance of the override request by Expression (3) using the calculated braking time. Each of the reserved time and the driver's operation time in Expression (3) is a predetermined time.

Figure 13:
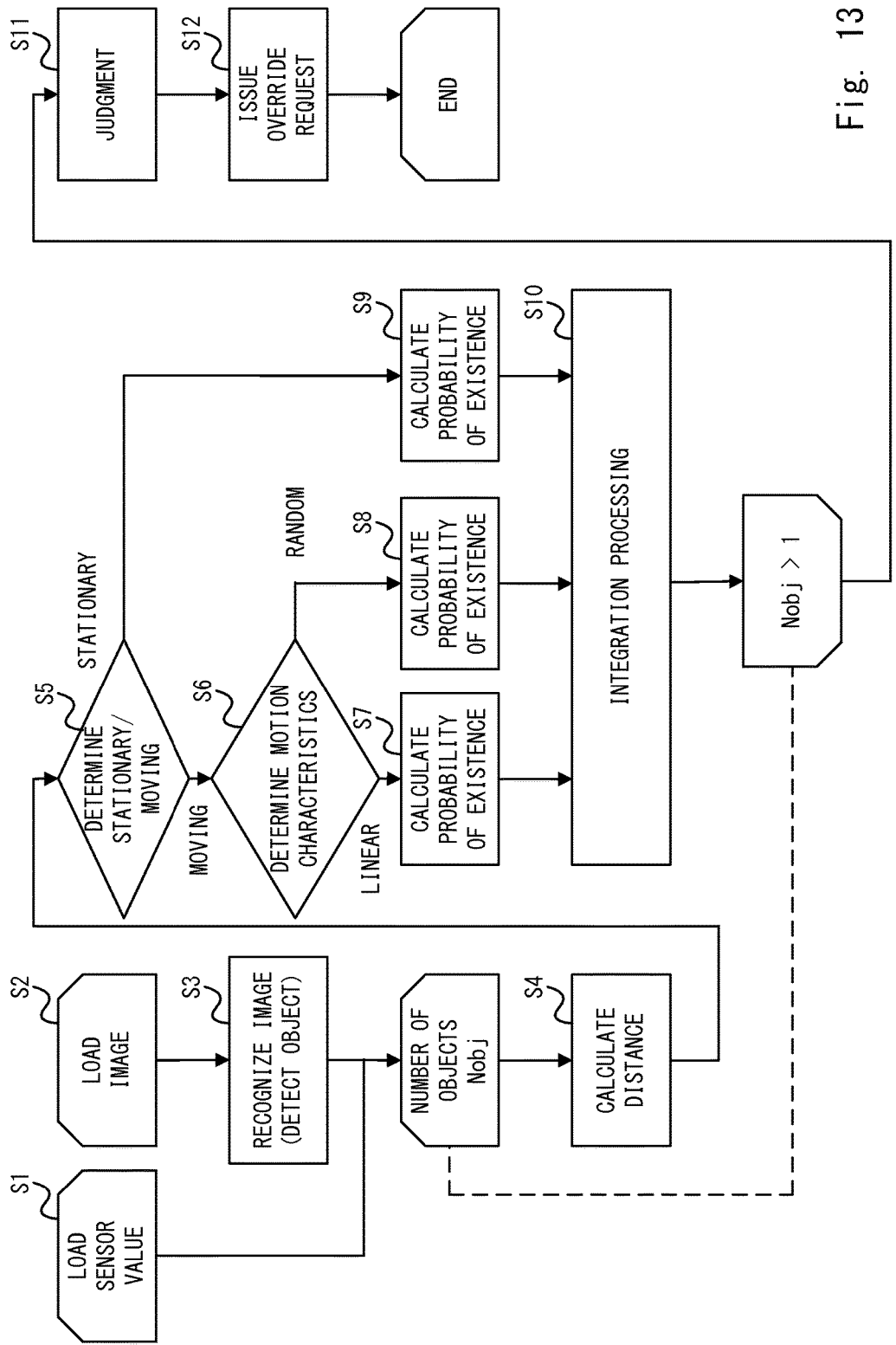
FIG. 13 is a flowchart showing processing for issuing an override request in the LSI according to the first embodiment.

Referring next to FIG. 13, the override request judgment processing of the LSI 6 according to the first embodiment will be described. The judgment unit 50 executes subsequent processing at predetermined time intervals, for example, and judges whether or not it is necessary to transmit the override request.

The sensor input unit 53 receives the distance information transmitted from the distance sensor 3, and outputs the received distance information to the judgment unit 50 (S1). The camera input unit 52 receives the image information transmitted from the camera 2, and outputs the received image information to the image recognition unit 51 (S2). The image recognition unit 51 performs image recognition on the image indicated by the image information output from the camera input unit 52 (S3). Specifically, the image recognition unit 51 detects and recognizes each object included in the image. The image recognition unit 51 outputs the recognition result information indicating the recognition result to the judgment unit 50.

Next, the judgment unit 50 sequentially executes the processing of steps S4 to S10 on all objects recognized by the image recognition unit 51.

The judgment unit 50 calculates a distance from each object based on the distance information output from the sensor input unit 53 (S4). The judgment unit 50 determines whether or not the object is a stationary object or a moving object based on the recognition result indicated by the recognition result information output from the image recognition unit 51 (S5). When it is determined that the object is a moving object (S5: moving), the judgment unit 50 determines the motion characteristics of the object based on the image recognition result indicated by the image recognition result information output from the image recognition unit 51 (S6). In other words, the judgment unit 50 determines whether the object is a linearly moving object or a randomly moving object.

When it is determined that the object is a linearly moving object (S6: linear), the judgment unit 50 calculates the probability of existence of the linearly moving object as the probability of existence for the area in which the object is likely to move (S7). Specifically, the judgment unit 50 calculates a value by multiplying the coefficient for the linearly moving object by the probability of existence according to the distance from the system-mounted vehicle, as the probability of existence for the area in which the object is likely to move.

When it is determined that the object is a randomly moving object (S6: random), the judgment unit 50 calculates the probability of existence of the randomly moving object as the probability of existence for the area in which the object is likely to move (S8). Specifically, the judgment unit 50 calculates a value by multiplying the coefficient for the randomly moving object by the probability of existence according to the distance from the system-mounted vehicle, as the probability of existence for the area in which the object is likely to move.

When it is determined that the object is a stationary object (S5: stationary), the judgment unit 50 calculates the probability of existence of the stationary object as the probability of existence for the area in which the object is present (S9). Specifically, the judgment unit 50 calculates a maximum value of the probability of existence as the probability of existence for the area in which the object is present.

After the calculation of the probability of existence (after S7, S8, or S9), the judgment unit 50 executes integration processing for integrating the calculated probability of existence on a map (S10). In other words, the judgment unit 50 sets the calculated probability of existence on the map. At this time, in the area (grid) in which the probability of existence is already set, for example, a value obtained by adding the probability of existence to be subsequently set to the probability of existence already set may be set on the map, as described above.

After completion of the integration processing for all recognized objects, the judgment unit 50 judges whether or not it is possible to calculate the line along which the system-mounted vehicle can travel on the created map (S11). When it is judged that the line along which the system-mounted vehicle can travel cannot be calculated, the judgment unit 50 issues the override request for transfer from the automatic control mode to the manual control mode (S12).

Figure 14:
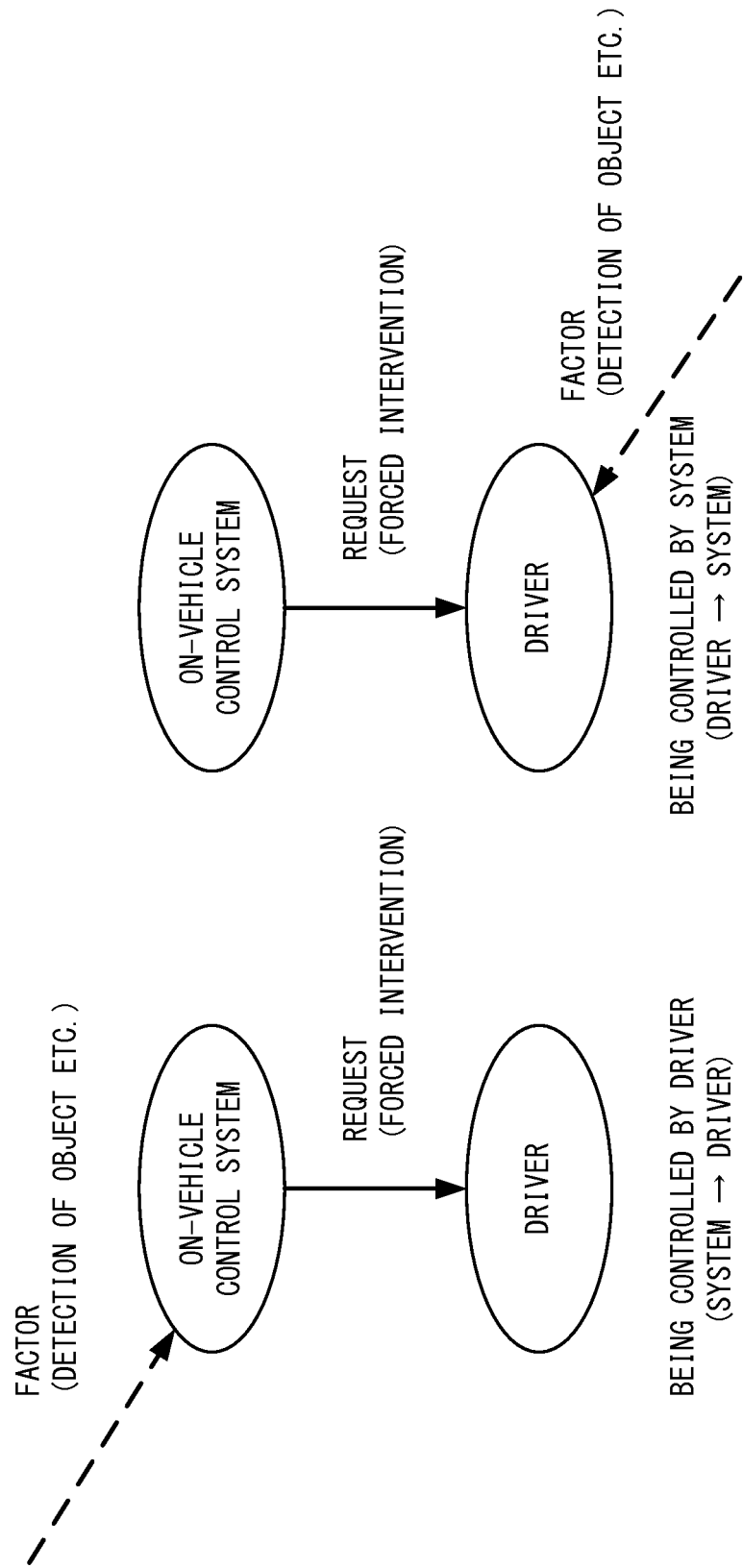
FIG. 14 is a conceptual diagram showing an override request by overwrite control.

As described above, in the control transfer of the related art, as shown in FIG. 14, the control is mainly performed in such a manner that the driver or the system tries to actively gain control of the vehicle. On the other hand, in this embodiment, the control mode is transferred from the automatic control mode to the manual control mode when the travel route to avoid each recognized object cannot be calculated during the calculation of the travel route for the vehicle in the automatic control mode. Accordingly, it is possible to transfer the control to the driver in the situation in which it is not absolutely safe, while the vehicle continues traveling in the automatic control mode as much as possible. Therefore, an accurate transfer of control from the system to the driver can be achieved.

Figure 15:
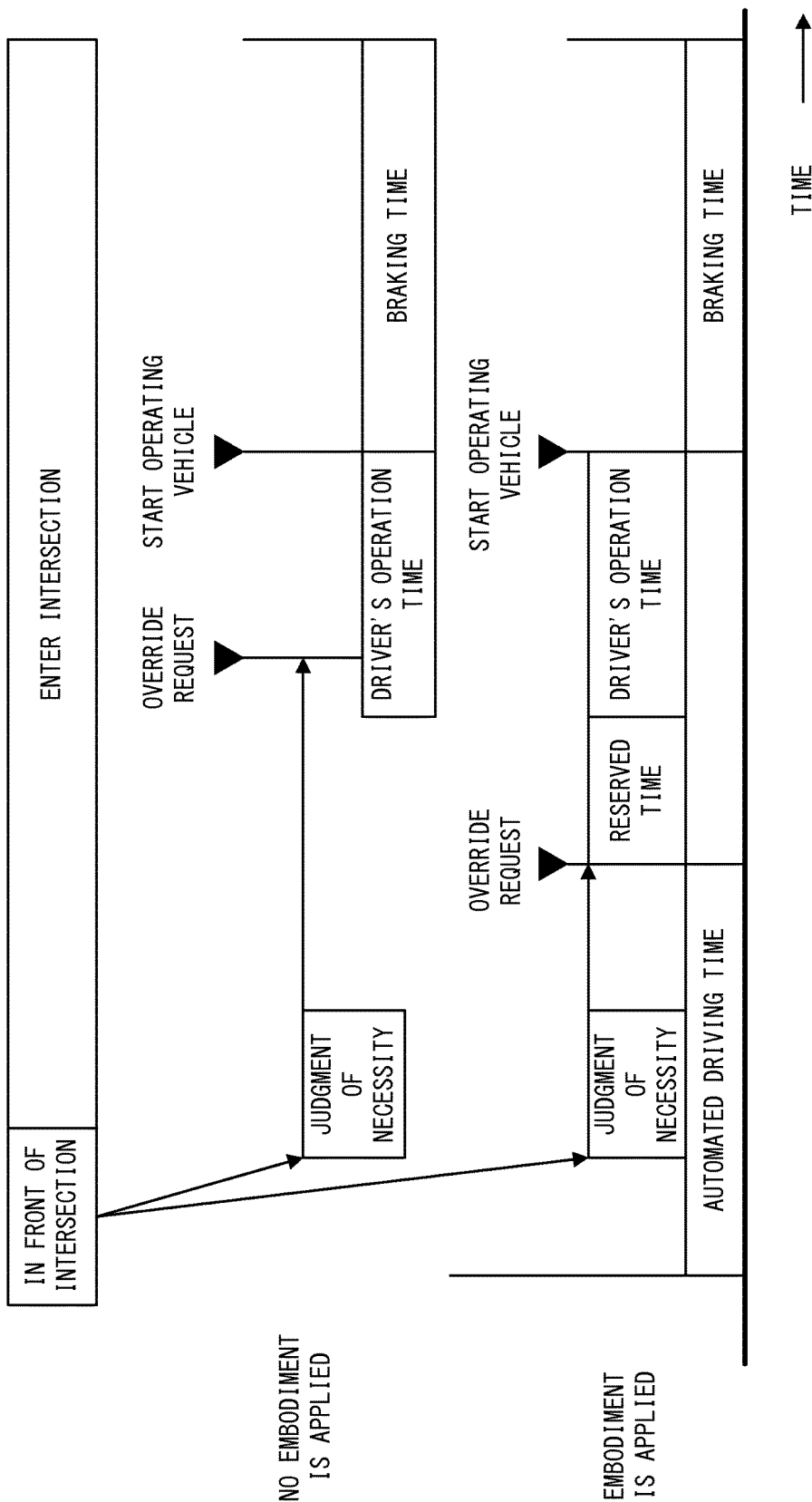
FIG. 15 is a diagram showing a comparison example of a timing for issuance of an override request.

In this embodiment, at least a threshold amount of time in advance of a time at which the vehicle is estimated to reach an object, the control mode is transferred from the automatic control mode to the manual control mode. The threshold amount of time includes a preparation time defined as a time required for the driver to start operating the vehicle so as to brake the vehicle, and a braking time of the vehicle calculated based on the speed of the vehicle. With this configuration, the transfer of control at an appropriate timing when a sufficient operation time for the driver is ensured can be achieved as shown in FIG. 15.

Second Embodiment

Figure 16:
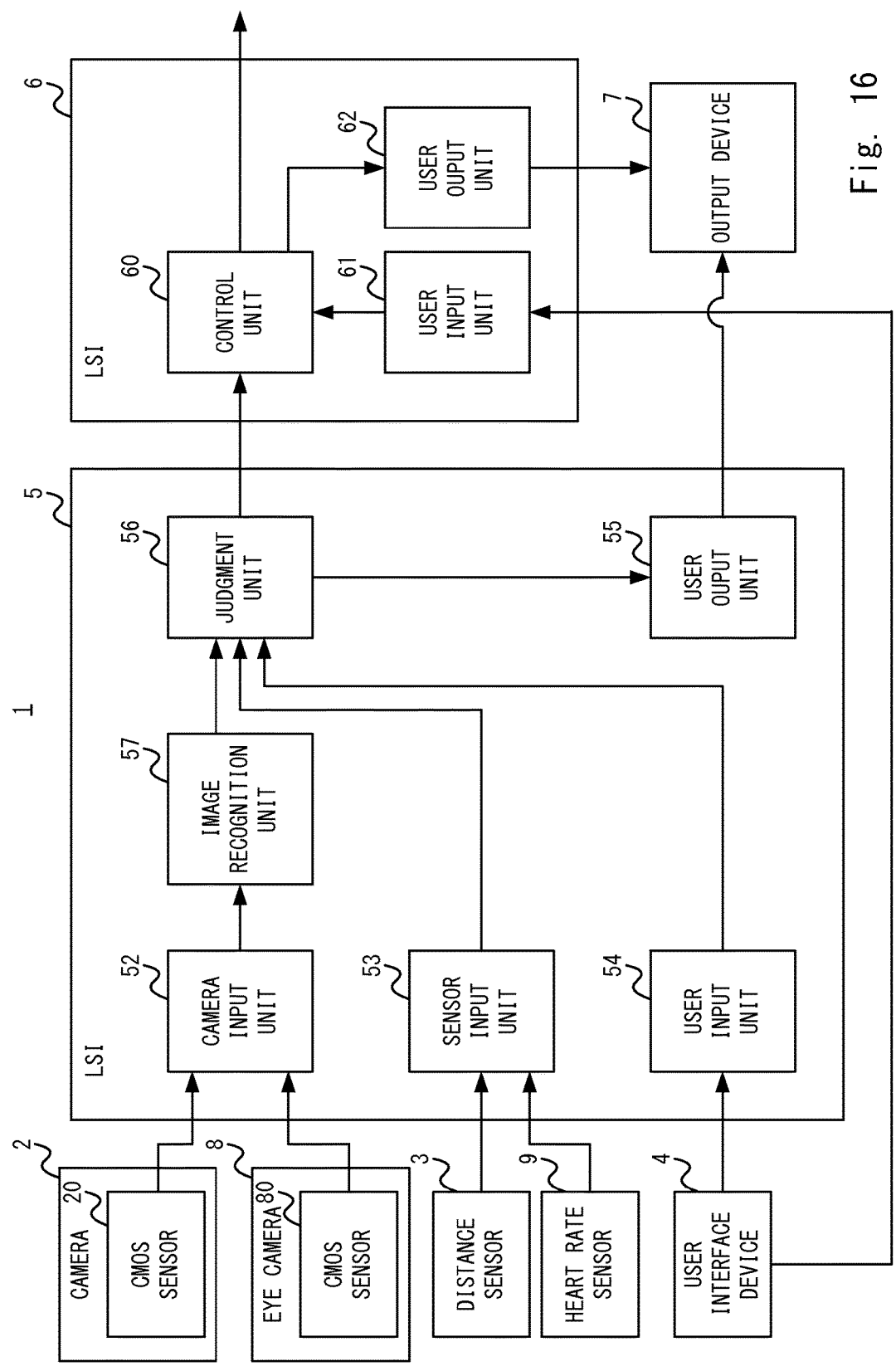
FIG. 16 is a block diagram showing an on-vehicle control system according to a second embodiment.

Next, a second embodiment will be described. Referring first to FIG. 16, the system configuration of the on-vehicle control system 1 according to the second embodiment will be described. The description of the elements of the second embodiment similar to those of the first embodiment is omitted as needed.

As compared with the on-vehicle control system 1 according to the first embodiment, the on-vehicle control system 1 according to the second embodiment further includes an eye camera 8 and a heart rate sensor 9. Further, the LSI 5 according to the second embodiment differs from the LSI 5 according to the first embodiment in that the judgment unit 50 and the image recognition unit 51 are replaced by a judgment unit 56 and an image recognition unit 57, respectively.

The eye camera 8 is a device that captures an image of a driver of a vehicle. The eye camera 8 includes a CMOS sensor 80. The CMOS sensor 80 captures the image of the driver to generate image information indicating the image of the driver, and transmits the generated image information to the LSI 5. The eye camera 8 is mounted on the vehicle in such a manner that at least the eyes of the driver are included in the imaging range of the eye camera 8.

The heart rate sensor 9 measures the heart rate of the driver, and transmits heart rate information indicating the measured heart rate to the LSI 5. The heart rate sensor 9 is installed in the vehicle at a location where the heart rate of the driver can be measured. For example, the heart rate sensor 9 is installed in the steering wheel, a seat belt, or the like of the vehicle.

Accordingly, in the second embodiment, the camera input unit 52 further receives the image information transmitted from the eye camera 8 and outputs the received image information to the image recognition unit 57. The sensor input unit 53 further receives the heart rate information transmitted from the heart rate sensor 9, and outputs the received heart rate information to the judgment unit 56.

As compared with the image recognition unit 51 according to the first embodiment, the image recognition unit 57 of the second embodiment recognizes the motion of the line of sight of the driver based on the image indicated by the image information from the eye camera 8 which is output from the camera input unit 52. The image recognition unit 57 outputs line-of-sight recognition result information indicating the recognition result to the judgment unit 56.

As compared with the judgment unit 50, the judgment unit 56 further performs processing for calculating the stress level of the driver based on the recognition result indicated by the line-of-sight recognition result information output from the image recognition unit 57 and the heart rate indicated by the heart rate information output from the sensor input unit 53. The judgment unit 56 adjusts the reserved time used for calculation of the threshold amount of time for issuance of the override request according to the calculated stress level.

The stress level is calculated in such a manner that, for example, the stress level increases in accordance with an increase in the rate at which the line of sight is determined to have moved between images within a predetermined period of time. For example, the judgment unit 56 determines that the line of sight is moved when the motion of the line of sight (for example, a pupil motion vector) exceeds a predetermined threshold. Further, the stress level is calculated in such a manner that the stress level increases in accordance with an increase in the heart rate of the driver.

Figure 17:
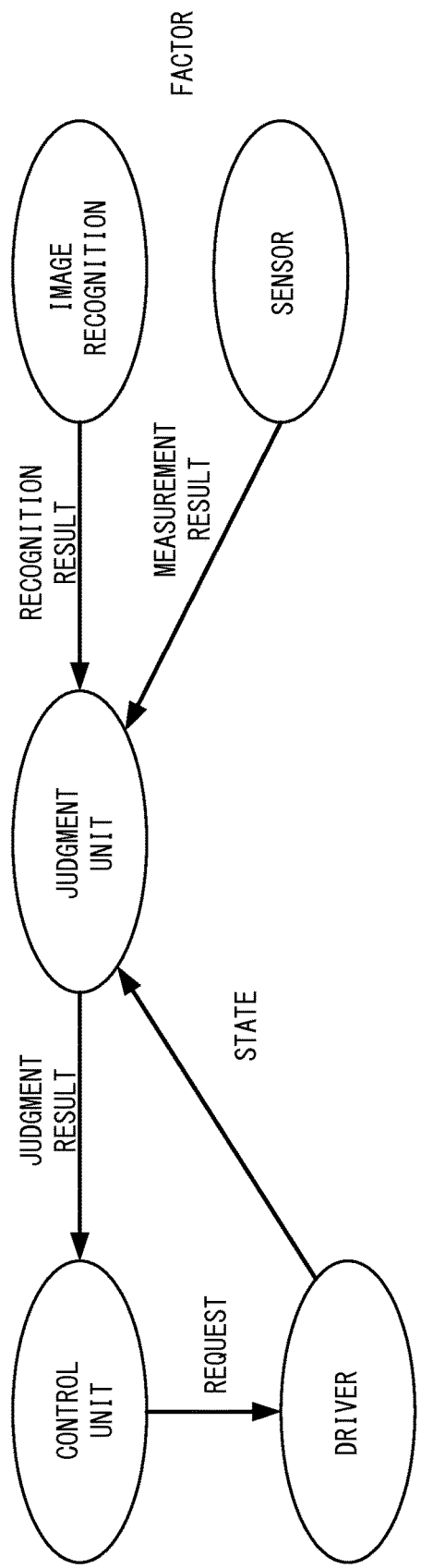
FIG. 17 is a relationship diagram showing elements associated with issuance of an override request according to the second embodiment.

Referring next to FIG. 17, relations between elements associated with issuance of the override request will be described. FIG. 17 shows an example in which the second embodiment is applied based on the relationship shown in FIG. 9 described in the first embodiment.

As compared with the judgment unit 50 of the first embodiment, the judgment unit 56 according to the second embodiment further obtains the motion of the line of sight and the heart rate of the driver as the state of the driver. As compared with the judgment unit 50 of the first embodiment, the judgment unit 56 further makes a judgment on the issuance of the override request based on the state of the driver.

Figure 18:
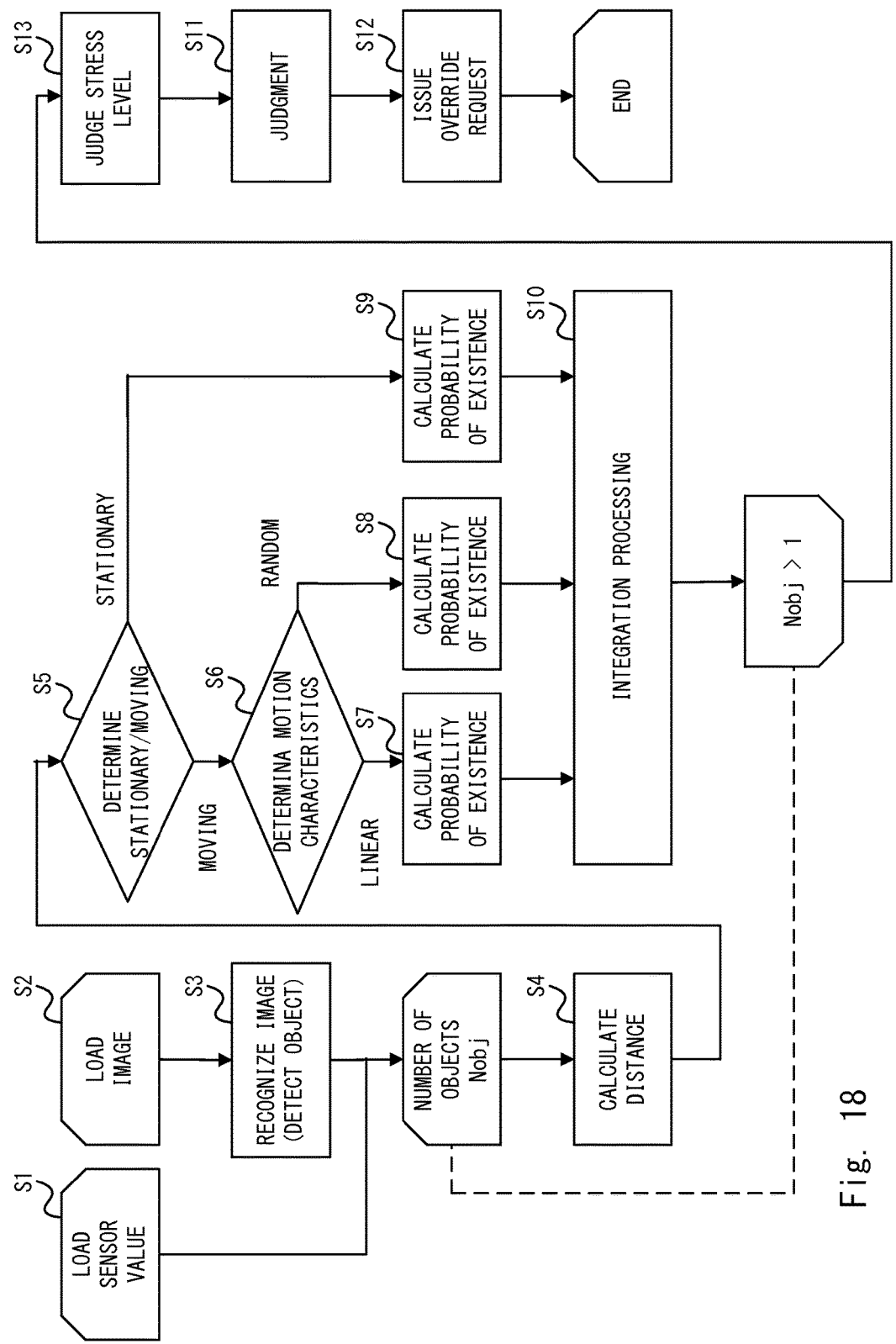
FIG. 18 is a flowchart showing processing for issuing an override request in an LSI according to the second embodiment.

Referring next to FIG. 18, the override request judgment processing of the LSI 5 according to the second embodiment will be described. Steps S1 to S12 shown in FIG. 18 are similar to steps S1 to S12 shown in FIG. 12 described in the first embodiment, and thus the description thereof is omitted.

In the second embodiment, after completion of the integration processing (S10) on all recognized objects, the judgment unit 50 calculates the stress level of the driver, and adjusts the reserved time according to the calculated stress level (S13). In the case of issuing the override request in step S12, the judgment unit 50 calculates the threshold amount of time for issuance of the override request by using the adjusted reserved time.

Figure 19:
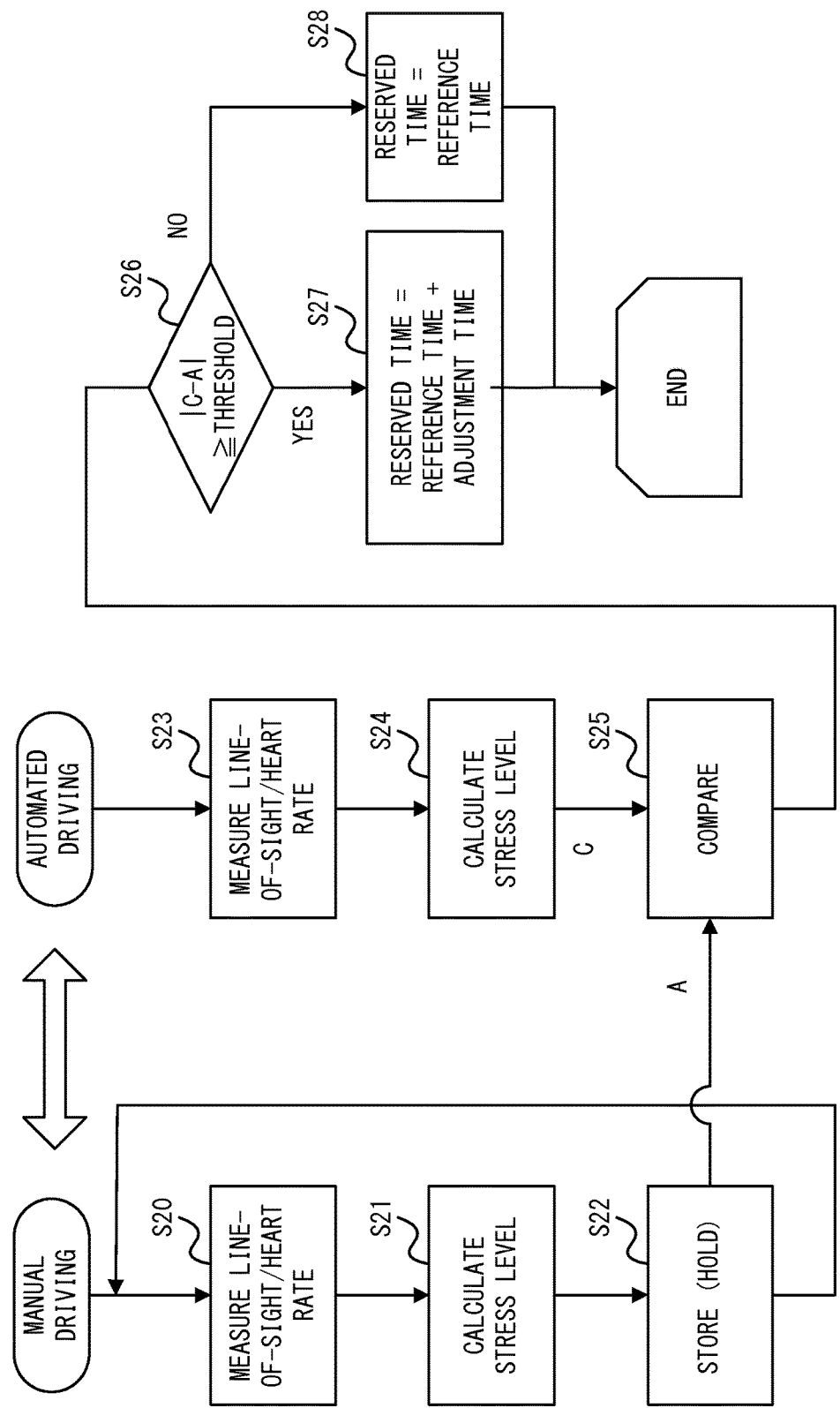
FIG. 19 is a flowchart showing processing for adjusting a reserved time in the LSI according to the second embodiment.

Referring next to FIG. 19, the reserved time adjustment processing of the LSI 5 according to the second embodiment will be described. Steps S23 to S28 shown in FIG. 19 correspond to step S13 shown in FIG. 17.

First, the processing in a manual driving mode will be described. The judgment unit 50 carries out the processing of steps S20 to S22 as described below, for example, every time a predetermined time elapses. The eye camera 8 captures the image of the driver, and transmits image information indicating the image of the driver to the LSI 5. The heart rate sensor 9 measures the heart rate of the driver, and transmits heart rate information indicating the measured heart rate to the LSI 5 (S20). The judgment unit 56 calculates a stress level A of the driver based on the motion of the line of sight of the driver, which is indicated by the line-of-sight recognition result information output from the image recognition unit 57, and the heart rate indicated by the heart rate information transmitted from the heart rate sensor 9 (S21). The judgment unit 56 stores stress level information indicating the calculated stress level A in the built-in memory 12 (S22). The stress level A is used as a reference value for the stress level of the driver in the normal state.

Next, the processing in an automated driving mode will be described. Steps S23 and S24 are similar to steps S20 and S21, and thus the description thereof is omitted. The judgment unit 56 compares the stress level A, which is calculated in advance in the manual driving mode, with a stress level C (calculated in step S24) which is obtained when the override request is to be issued in the automated driving mode (S25). The judgment unit 56 judges whether the difference between the stress level C and the stress level A is equal to or more than a predetermined threshold (S26).

When the judgment unit 56 judges that the difference between the stress level A and the stress level C is equal to or more than the predetermined threshold (S26: Yes), the judgment unit 56 sets, as the reserved time, the time obtained by adding an adjustment time to a predetermined reference time (S27). In this case, the reference time is the reserved time when the driver is in the normal state.

When the judgment unit 56 judges that the difference between the stress level A and the stress level C is less than the predetermined threshold (S26: No), the judgment unit 56 sets the predetermined reference time as the reserved time (S28).

As described above, in the second embodiment, the stress level of the driver is calculated based on the measurement result of the state of the driver, and when the calculated stress level exceeds a predetermined appropriate range, the preparation time is increased. With this configuration, a more sufficient operation time for the driver can be ensured regardless of the state of the driver.

Third Embodiment

Figure 20:
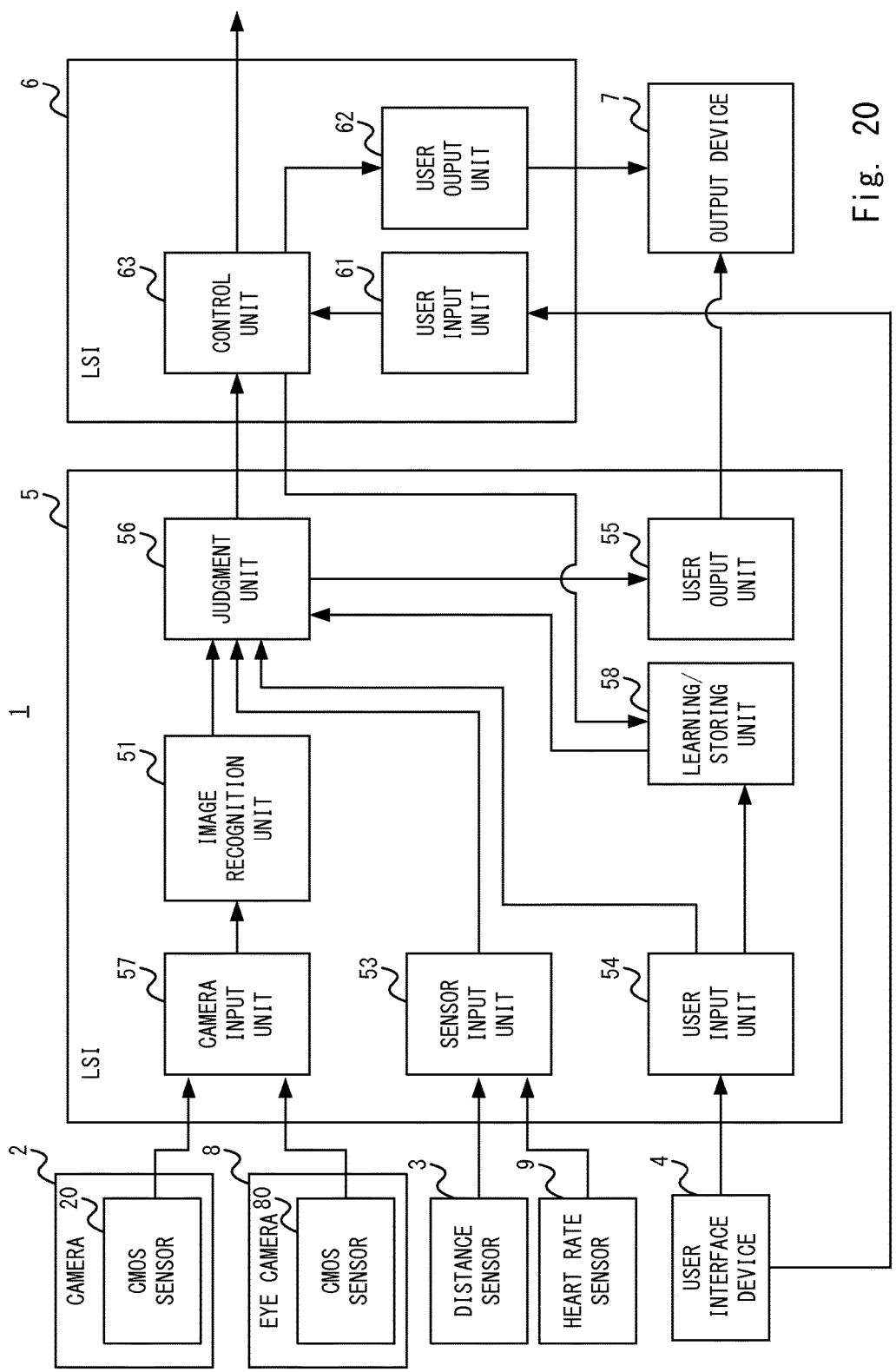
FIG. 20 is a block diagram showing an on-vehicle control system according to a third embodiment.

Next, a third embodiment will be described. Referring first to FIG. 20, the system configuration of the on-vehicle control system 1 according to the third embodiment will be described. The description of the elements of the third embodiment similar to those of the second embodiment is omitted as needed.

The LSI 5 in the on-vehicle control system 1 according to the third embodiment further includes a learning/storing unit 58, as compared with the LSI 5 according to the second embodiment. The LSI 6 according to the third embodiment includes a control unit 63 instead of the control unit 60 included in the LSI 6 of the second embodiment.

The learning/storing unit 58 learns and stores the operation of the user upon issuance of the override request, based on the operation information transmitted from the user interface device 4. The learning/storing unit 58 adjusts the driver's operation time, which is used for the judgment unit 56 to calculate the threshold amount of time for issuance of the override request, according to the learning result.

As compared with the control unit 60 according to the first and second embodiments, the control unit 63 of the third embodiment further notifies the learning/storing unit 58 of the notification information notifying that the control mode is transferred from the automatic control mode to the manual control mode, upon receiving, from the judgment unit 56, the judgment result information indicating the judgment result that the control mode is transferred from the automatic control mode to the manual control mode. This notification information enables the learning/storing unit 58 to recognize the timing for issuing the override request (timing of transfer from the automatic control mode to the manual control mode).

Figure 21:
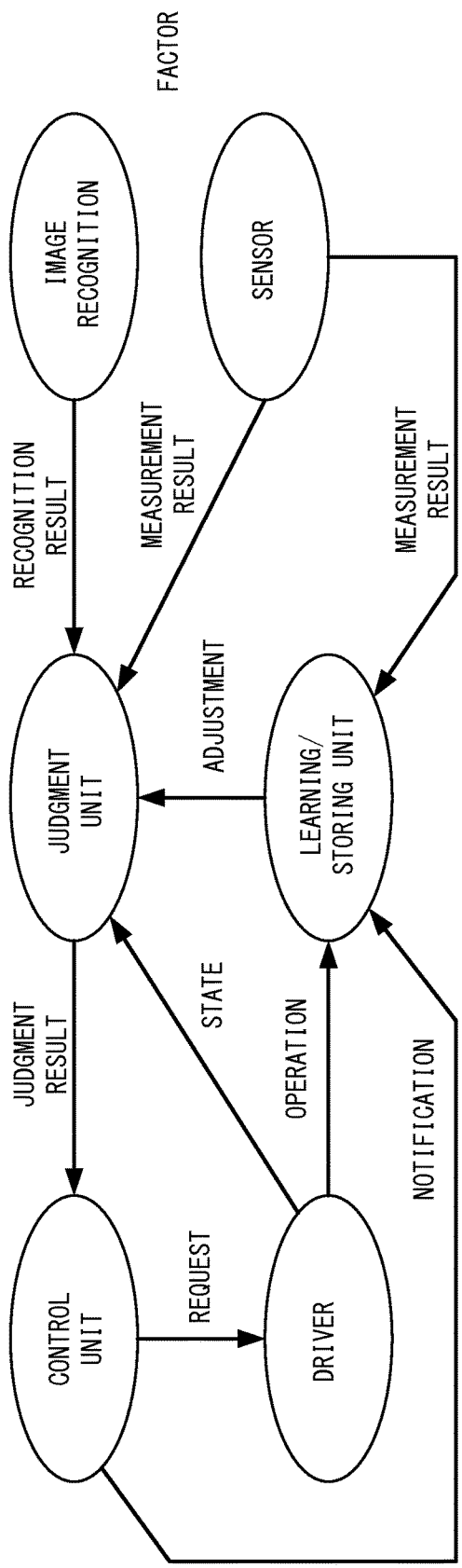
FIG. 21 is a relationship diagram showing elements associated with issuance of an override request according to the third embodiment.

Referring next to FIG. 21, relations between elements associated with issuance of the override request will be described. FIG. 21 shows an example in which the second and third embodiments are applied based on the relationship shown in FIG. 9 described in the first embodiment.

In the third embodiment, the learning/storing unit 58 learns and stores the operation of the driver as the state of the driver. The control unit 63 performs not only the operation of the control unit 60 according to the first and second embodiments, but also notifies the learning/storing unit 58 of issuance of the override request according to the notification of the judgment result. This enables the learning/ storing unit 58 to recognize the operation of the user upon issuance of the override request. The learning/storing unit 58 learns the operation of the user upon issuance of the override request. The learning/storing unit 58 adjusts the driver's operation time, which is used by the judgment unit 56, according to the learning result. The notification of issuance of the override request may be transmitted to the learning/ storing unit 58 when the judgment unit 56 issues the override request.

Figure 22:
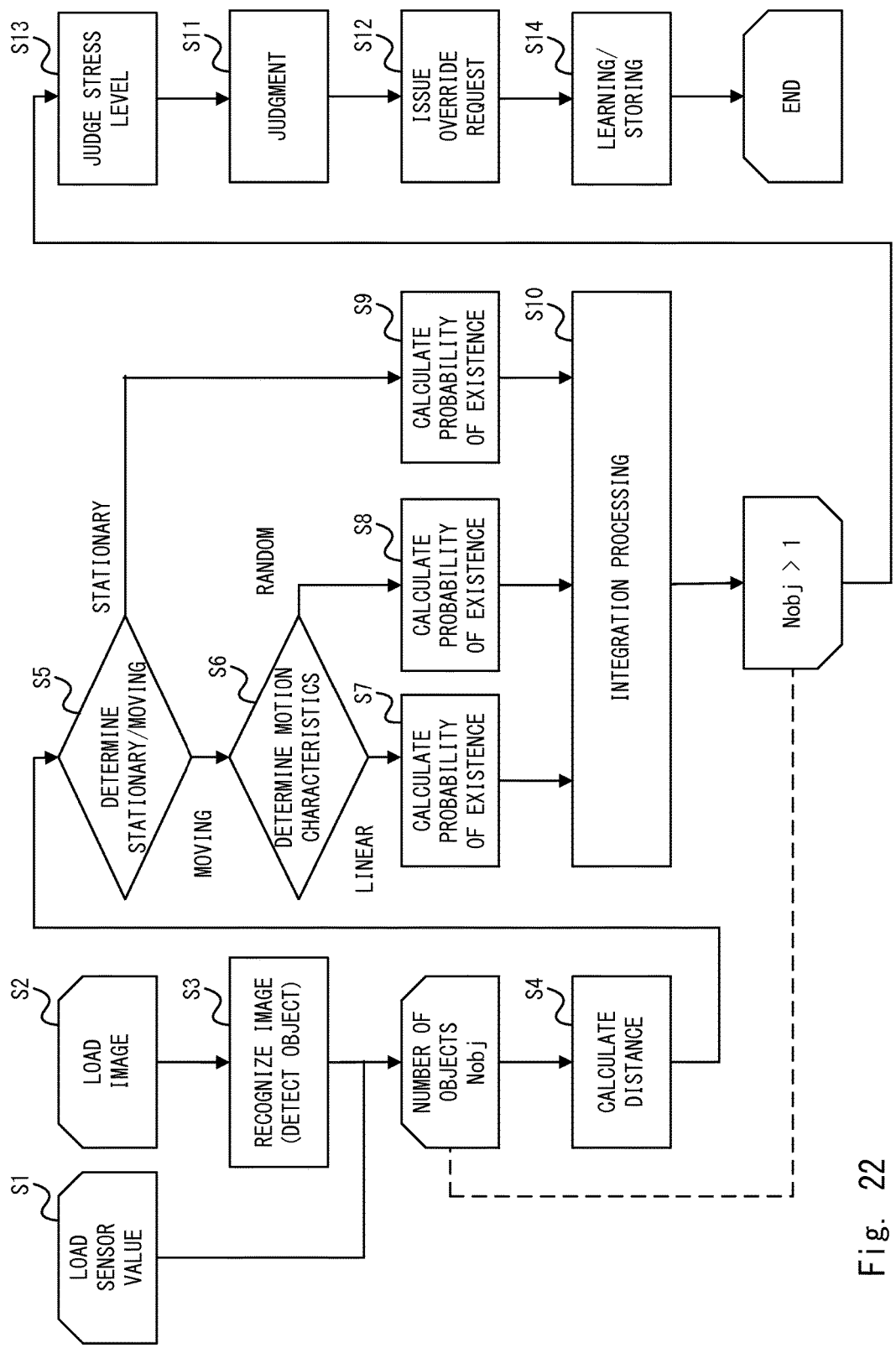
FIG. 22 is a flowchart showing processing for issuing an override request in the LSI according to the third embodiment.

Referring next to FIG. 22, the override request judgment processing of the LSI 5 according to the third embodiment will be described. Steps S1 to S13 shown in FIG. 22 are similar to steps S1 to S13 shown in FIG. 18 described in the second embodiment, and thus the description thereof is omitted.

In the third embodiment, after issuance of the override request (S12), the learning/storing unit 58 learns and stores the operation of the user upon issuance of the override request, based on the operation information transmitted from the user interface device 4 (S14). Further, when the override request is issued in step S12, the learning/storing unit 58 adjusts the driver's operation time, which is used by the judgment unit 56, according to the learning result.

Figure 23:
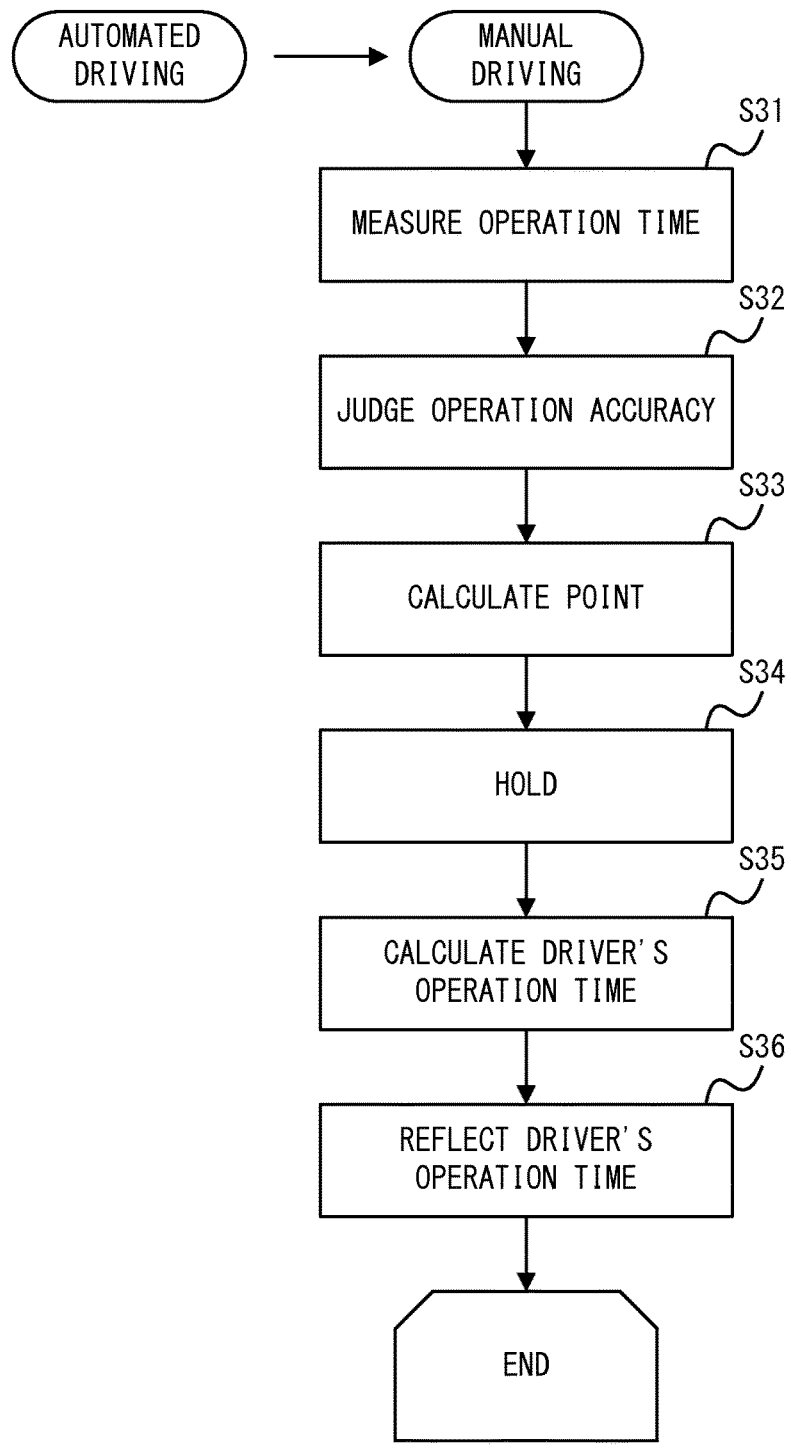
FIG. 23 is a flowchart showing processing for adjusting a driver's operation time in the LSI according to the third embodiment.

Referring next to FIG. 23, the driver's operation time adjustment processing of the LSI 5 according to the third embodiment will be described. Steps S31 to S36 shown in FIG. 23 correspond to step S14 shown in FIG. 22.

The learning/storing unit 58 measures a time period from a time at which the override request is issued to a time at which the operation is started by the driver (S31). As described above, the learning/storing unit 58 recognizes the time at which the override request is issued, as the time at which the notification information from the control unit 63 is received. Further, the learning/storing unit 58 recognizes the time at which the operation is started by the driver, as the time at which the operation information indicating that the operation has been performed by the driver is received from the user interface device 4.

Furthermore, the learning/storing unit 58 makes a judgement on the accuracy of the operation by the driver from the time at which the override request is issued (S32). The learning/storing unit 58 calculates the degree of accuracy as the accuracy of the operation, for example, in such a manner that the value of the degree of accuracy increases in accordance with an increase in the accuracy of the operation. In this case, the accuracy of the operation is judged based on, for example, whether or not the operation of the system-mounted vehicle by the driver matches its expected value as described below.

In a first method, the learning/storing unit 58 may make a judgment on the accuracy of the operation based on whether or not the user interface device 4 operated by the driver matches the expected user interface device 4. For example, since it is expected to brake the system-mounted vehicle after issuance of the override request, the brake is determined in advance as the expected user interface device 4. The learning/storing unit 58 calculates a higher degree of accuracy when the operation information received from the user interface device 4 is the operation information from the brake, and calculates a lower degree of accuracy when the operation information received from the user interface device 4 is the operation information from the steering wheel or the accelerator.

In a second method, the learning/storing unit 58 may make a judgment on the accuracy of the operation based on whether or not the travel route of the system-mounted vehicle calculated by the judgment unit 56 matches the travel route of the system-mounted vehicle operated by the driver. For example, in this case, the judgment unit 56 creates the above-mentioned map information to indicate the calculated travel route. The learning/storing unit 58 compares the travel route on the map indicated by the map information, which is stored in the built-in memory 12 by the judgment unit 56, with the actual travel route of the system-mounted vehicle calculated based on the operation information received from the user interface device 4, and judges the degree of matching the travel routes. Further, the learning/storing unit 58 calculates the degree of accuracy in such a manner that the degree of accuracy increases in accordance with an increase in the degree of matching between the travel routes.

Thus, the degree of accuracy of the operation by the driver is calculated in such a manner that the degree of accuracy is higher when the operation by the driver matches its expected value, than when the operation by the driver does not match its expected value. It is also possible to comprehensively calculate the degree of accuracy by implementing these two methods.

The learning/storing unit 58 calculates a point indicating the evaluation result of the operation by the driver based on the time period measured in step S31 and the judgment result obtained in step S32 (S33). This point is calculated in such a manner that the value of the point is higher when the time period measured in step S31 is shorter than the current preparation time, than when the time period measured in step S31 is longer than the current preparation time. Further, this point is calculated in such a manner that the value of the point increases in accordance with an increase in the driving accuracy calculated in step S32. The learning/storing unit 58 stores point information indicating the calculated point in the built-in memory 12 (S34). An average value obtained by averaging the value of this point and values of a plurality of points previously calculated may be stored as the learning result.

The learning/storing unit 58 calculates the driver's operation time based on the point information stored in the built-in memory 12 (S35). The driver's operation time is calculated in such a manner that the driver's operation time increases as the value of the point decreases. For example, the driver's operation time may be calculated as a value that is inversely proportional to the point. Further, for example, the driver's operation time may be calculated in such a manner that a predetermined adjustment value is added to a predetermined reference value for the driver's operation time, when the value of the point is lower than a predetermined threshold. The learning/storing unit 58 reflects the calculated driver's operation time as the driver's operation time used by the judgment unit 56 (S36).

As described above, in the third embodiment, the time period from the time at which the control mode is transferred from the automatic control mode to the manual control mode to the time at which the driver starts operating the vehicle is measured, and the evaluation value (point) is calculated in such a manner that the evaluation value is larger when the measured time period is shorter than the preparation time, than when the measured time period is longer than the preparation time. Further, the operation of the vehicle by the driver from the time at which the control mode is transferred from the automatic control mode to the manual control mode is compared with its expected value. The evaluation value is calculated in such a manner that the evaluation value is larger when the operation and its expected value match each other, than when the operation and its expected value do not match. The preparation time is calculated and updated in such a manner that the preparation time increases as the evaluation value decreases. According to this configuration, it is possible to ensure a more sufficient operation time for the driver, regardless of the operation ability of the driver.

Fourth Embodiment

Figure 24:
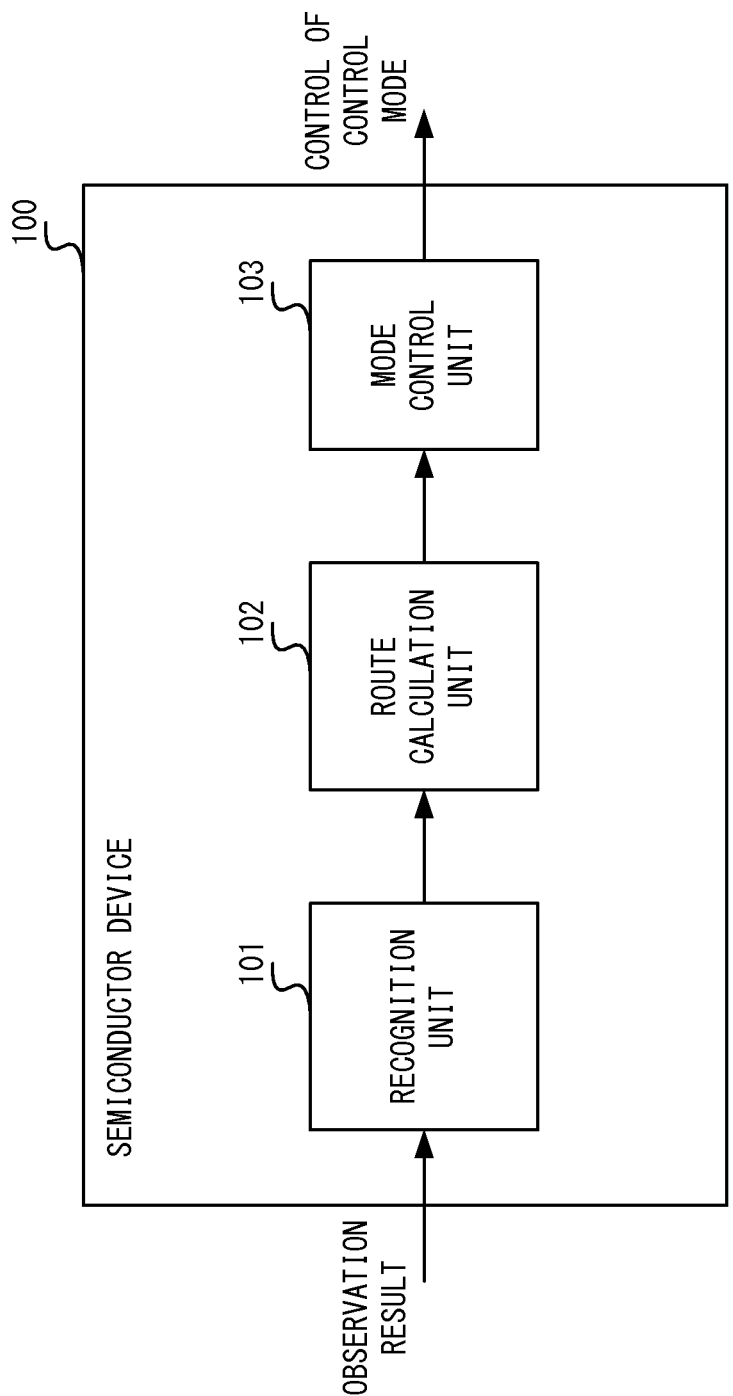
FIG. 24 is a diagram showing a semiconductor device according to an embodiment.

Referring now to FIG. 24, an embodiment extracted from the above-described first to third embodiments will be described as a fourth embodiment. As shown in FIG. 24, a semiconductor device 100 according to the fourth embodiment controls transfer of the control mode of the vehicle between the manual control mode for controlling the vehicle according to the operation by the driver, and the automatic control mode for automatically controlling the vehicle. The semiconductor device 100 includes a recognition unit 101, a route calculation unit 102, and a mode control unit 103.

The recognition unit 101 recognizes each object present in the periphery of the vehicle based on the observation result of the vehicle. The route calculation unit 102 calculates a travel route for the vehicle in the automatic control mode based on the recognized objects. The mode control unit 103 transfers the control mode from the automatic control mode to the manual control mode when the travel route to avoid the recognized objects cannot be calculated. The recognition unit 101 corresponds to the image recognition units 51 and 57. The route calculation unit 102 and the mode control unit 103 correspond to the judgment units 50 and 56.

According to this configuration, it is possible to transfer the control to the driver in the situation in which the control should be transferred to the driver, while the vehicle continues traveling in the automatic control mode as much as possible. Consequently, an accurate transfer of control from the system to the driver can be achieved.

The invention made by the present inventors has been described in detail above with reference to several embodiments. However, the present invention is not limited to the above embodiments and can be modified in various manners without departing from the scope of the invention.

For example, the above-described embodiments illustrate an example in which one sensor 3, one sensor 9, one sensor 20, and one sensor 80 are provided. However, the number of each type of sensors is not limited to one. A plurality of sensors 9, a plurality of sensors 9, a plurality of sensors 20, and a plurality of sensors 80 may be provided. The image recognition units 51 and 57 and the judgment units 50 and 56 may comprehensively judge the information from the plurality of sensors.

While the above-described first to third embodiments illustrate an example in which the image recognition units 51 and 57, the judgment units 50 and 56, and the control units 60 and 61 are provided in different LSIs 5 and 6, the present invention is not limited to this case. The image recognition units 51 and 57, the judgment units 50 and 56, and the control units 60 and 63 may be provided in a single LSI. In this case, one of the user input units 54 and 61 and one of the user output units 55 and 62 may be provided.

While the above-described first to third embodiments illustrate an example in which moving objects are further categorized as a linear moving object and a randomly moving object, the moving objects may not be categorized as the linear moving object and the randomly moving object. Further, the travel route may be calculated so as to avoid an area in which a stationary object is present and an area in which a moving object is likely to move, without taking into consideration of the probability of existence. However, as described in the above embodiments, it is preferable to take into consideration the category of the moving object and the probability of existence of the object. This makes it possible to make a judgment in consideration of the actual situation, leading to an improvement in the accuracy of the judgment.

While the above-described first to third embodiments illustrate an example in which only the objects present within the movable area shown in FIG. 6 are taken into consideration, the present invention is not limited to this case. There is also a possibility that objects present outside the movable area may move into the movable area. Accordingly, it is preferable to make a judgment as to whether or not it is necessary to send the override request, by considering not only the objects present within the movable area, but also the objects present outside the movable area.

While the above-described first to third embodiments illustrate an example in which the area in which a moving object is likely to move is calculated as shown in FIGS. 4 and 5, the present invention is not limited to this case. The LSI 5 may be provided with a radio communication unit that communicates with another LSI 5 by radio communication, and may receive travel route information indicating the travel route calculated by the LSI 5 from the LSI 5 mounted on another vehicle through the radio communication unit. Further, the judgment unit 50 may calculate the travel route indicated by the received travel route information as an area in which another vehicle (object) is likely to move.

The above-described second embodiment illustrates an example in which the stress level is calculated based on both the motion of line of sight and the heart rate. However, the stress level may be calculated based on one of the motion of line of sight and the heart rate.

While the above-described second embodiment illustrates an example in which it is judged whether the difference between the stress level A and the stress level C (the absolute value of the value obtained by subtracting the stress level A from the stress level C) is equal to or more than the predetermined threshold, the present invention is not limited to this case. For example, when the stress level C is higher than the stress level A and the value obtained by subtracting the stress level A from the stress level C is equal to or more than the threshold, the reserved time may be adjusted (S27), and in the other cases, the reserved time may not be adjusted (S28).

In the above-described third embodiment, the point is calculated based on both the measured time and the operation accuracy. However, the point may be calculated based on one of the measured time and the operation accuracy.

While the above-described third embodiment illustrates an example in which the learning/storing unit 58 is applied to the configuration of the second embodiment, the learning/storing unit 58 may be applied to the configuration of the first embodiment.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device, comprising:
    a recognition unit that recognizes an object present in a periphery of a vehicle based on a result of an observation of the periphery of the vehicle;
    a route calculation unit, connected to a distance sensor, that calculates, based on the recognized object, a travel route for the vehicle in an automatic control mode for automatically controlling the vehicle;
    a mode control unit that transfers the vehicle from the automatic control mode to a manual control mode for controlling the vehicle according to an operation by a driver, when a travel route to avoid contacting with the recognized object cannot be calculated; and
    a friction coefficient calculation unit that calculates a friction coefficient between the vehicle and a road surface based on a distance required for the vehicle to stop from a time when a control for braking the vehicle is started, and on a speed of the vehicle when the control for braking the vehicle is started,
    wherein the mode control unit calculates a braking time of the vehicle based on the calculated friction coefficient and a speed of the vehicle.

2. The semiconductor device according to claim 1, wherein the route calculation unit creates, for the recognized object, a map representing an object existing area in which a stationary object is present and an object moving area in which is calculated a projected path for a moving object, and calculates a movement route to avoid each of the object existing area and the object moving area on the created map.

3. The semiconductor device according to claim 2, wherein the route calculation unit sets, for each of the object existing area and the object moving area, a probability of existence representing a probability that the object is recognized in the object existing area and the object moving area, in such a manner that the probability of existence increases as a distance from the vehicle decreases, and calculates a travel route that does not overlap an area in which the probability of existence of the vehicle is equal to or more than a predetermined threshold.

4. The semiconductor device according to claim 2, wherein the route calculation unit sets, for each of the object existing area and the object moving area, a probability of existence representing a probability that the object is recognized in the object existing area and the object moving area, in such a manner that the probability of existence has a larger value in the object existence area than in the object moving area, and calculates a travel route that does not overlap an area in which the probability of existence of the vehicle is equal to or more than a predetermined threshold.

5. The semiconductor device according to claim 4, wherein the route calculation unit sets, for the object moving area, the probability of existence in such a manner that the probability of existence has a larger value when the moving object is a randomly moving object than when the moving object is a linearly moving object.

6. The semiconductor device according to claim 1, wherein at least in a threshold amount of time in advance of a time at which the vehicle is estimated to reach the object, the mode control unit transfers the vehicle from the automatic control mode to the manual control mode, and the threshold amount of time including a preparation time defined as a time required for the driver to start operating the vehicle so as to brake the vehicle.

7. The semiconductor device according to claim 6, further comprising a stress level calculation unit that calculates a stress level of the driver based on a result of measurement of a state of the driver evaluated based on heart rate information of the driver,
    wherein the mode control unit increases the preparation time when the calculated stress level exceeds a predetermined appropriate range.

8. The semiconductor device according to claim 6, further comprising a learning unit that measures a time period from a time when the vehicle is transferred from the automatic control mode to the manual control mode to a time when the driver starts operating the vehicle, and calculates an evaluation value such that the evaluation value is larger when the measured time period is shorter than the preparation time, than when the measured time period is longer than the preparation time,
    wherein the learning unit calculates and updates the preparation time such that the preparation time increases as the evaluation value decreases.

9. The semiconductor device according to claim 6, further comprising a learning unit that compares an operation of the vehicle by the driver from a time when the vehicle is transferred from the automatic control mode to the manual control mode, with an expected value of the operation, and calculates an evaluation value such that the evaluation value is larger when the operation and the expected value match, than when the operation and the expected value do not match,
    wherein the learning unit calculates and updates the preparation time such that the preparation time increases as the evaluation value decreases.

10. A control method, comprising:
    recognizing, by a distance sensor, an object present in a periphery of a vehicle based on a result of an observation of the periphery of the vehicle;
    calculating a travel route for the vehicle in an automatic control mode for automatically controlling the vehicle based on the recognized object; and
    transferring the vehicle from the automatic control mode to a manual control mode for controlling the vehicle according to an operation by a driver, when a travel route to avoid contacting with the recognized object cannot be calculated,
    wherein at least in a threshold amount of time in advance of a time at which the vehicle is estimated to reach the recognized object, the mode control unit transfers the vehicle from the automatic control mode to the manual control mode, the threshold amount of time including a preparation time defined as a time required for the driver to start operating the vehicle so as to brake the vehicle, and a braking time of the vehicle calculated based on a speed of the vehicle.

11. The semiconductor device according to claim 1, wherein the mode control unit judges that the travel route to avoid the recognized object contacting with the vehicle cannot be calculated, based on a recognition result from the recognition unit and a measurement result from the distance sensor, during the automatic control mode.

12. The semiconductor device according to claim 1, wherein the mode control unit is configured such that, if the operation by the driver for the controlling the vehicle is not carried out after the transfer of control from the automatic control mode to the manual control mode, the mode control unit stops the vehicle to avoid contacting with the recognized object.

13. The control method according to claim 10, wherein, in the transferring the vehicle from the automatic control mode to the manual control mode, the mode control unit transfers the vehicle from the automatic control mode to the manual control mode when the travel route to avoid the recognized object contacting with the vehicle cannot be calculated.

14. The control method according to claim 10, wherein, in the transferring the vehicle from the automatic control, mode to the manual control mode, the mode control unit cannot calculate the travel route to avoid the recognized object contacting with the vehicle, based on a recognition result from the recognition unit and a measurement result from the distance sensor, during the automatic control mode.

15. The control method according to claim 10, wherein, in the transferring the vehicle from the automatic control mode to the manual control mode, the mode control unit controls the vehicle such that, if the operation by the driver for the controlling the vehicle is not carried out after the transfer of control from the automatic control mode to the manual control mode, the mode control unit stops the vehicle to avoid a contact with the recognized object.

16. The control method according to claim 10, further comprising:

calculating a friction coefficient between the vehicle and a road surface based on a distance required for the vehicle to stop from a time when a control for braking the vehicle is started, and on a speed of the vehicle when the control for braking the vehicle is started.

17. The control method according to claim 16, wherein the mode control unit calculates the braking time of the vehicle based on the calculated friction coefficient and the speed of the vehicle.

* * * * *